US009135843B2

(12) United States Patent

Farenc et al.

(10) Patent No.: US 9,135,843 B2

(45) Date of Patent: Sep. 15, 2015

(54) CHARGE PUMP FOR PRODUCING DISPLAY DRIVER OUTPUT

(71) Applicant: QUALCOMM MEMS Technologies, Inc., San Diego, CA (US)

(72) Inventors: Didier H. Farenc, San Diego, CA (US); Nada Vukovic-Radic, San Diego, CA (US)

(73) Assignee: QUALCOMM MEMS Technologies, Inc., San Diego, CA (US)

(*) Notice: Subject to any disclaimer, the term of this patent is extended or adjusted under 35 U.S.C. 154(b) by 25 days.

(21) Appl. No.: 13/677,817

(22) Filed: Nov. 15, 2012

(65) Prior Publication Data

US 2013/0321370 A1 Dec. 5, 2013

Related U.S. Application Data

(60) Provisional application No. 61/653,986, filed on May 31, 2012.

(51) Int. Cl.

| | |
|---|---|
| ***G06F 3/038*** | (2013.01) |
| ***G09G 1/00*** | (2006.01) |
| ***G09G 3/34*** | (2006.01) |

(52) U.S. Cl.

CPC .............. *G09G 1/005* (2013.01); *G09G 3/3466* (2013.01); *G09G 2310/0243* (2013.01); *G09G 2310/0254* (2013.01); *G09G 2330/021* (2013.01); *G09G 2330/028* (2013.01)

(58) Field of Classification Search

CPC ..... G09G 3/20; G09G 3/2011; G09G 3/3688; G09G 3/3648; G09G 3/3692

USPC ................... 345/42, 48, 55, 84–85, 204–211; 359/198, 247, 290–296, 302; 327/536

See application file for complete search history.

(56) References Cited

U.S. PATENT DOCUMENTS 4,954,789 A 9/1990 Sampsell
5,784,189 A 7/1998 Bozler et al.

(Continued)

FOREIGN PATENT DOCUMENTS

CN 1714385 A 12/2005
EP 1065650 A2 1/2001

(Continued)

OTHER PUBLICATIONS

International Search Report and Written Opinion—PCT/US2013/042623—ISA/EPO—Aug. 7, 2013.

(Continued)

*Primary Examiner* — Kent Chang
*Assistant Examiner* — Andrew Lee
(74) *Attorney, Agent, or Firm* — Knobbe Martens Olson & Bear LLP

(57) ABSTRACT

This disclosure provides systems, methods and apparatus for driving a display array with a waveform having a plurality of voltage levels, wherein a first subset of the plurality of voltages is different from a second subset of the plurality of voltages by a defined amount. In one aspect, a display driver circuit comprises a power supply configured to generate the first subset of said plurality of voltages, and a charge pump having the first subset of the plurality of voltages as inputs and the second subset of the plurality of voltages as outputs. The charge pump may not include a switch between each output voltage and a corresponding capacitor.

20 Claims, 17 Drawing Sheets

(56) References Cited

U.S. PATENT DOCUMENTS

| | | | |
|---|---|---|---|
| 6,040,937 A | 3/2000 | Miles | |
| 6,327,071 B1 | 12/2001 | Kimura | |
| 6,574,033 B1 | 6/2003 | Chui et al. | |
| 6,674,562 B1 | 1/2004 | Miles et al. | |
| 6,909,413 B2 | 6/2005 | Nanno et al. | |
| 7,042,643 B2 | 5/2006 | Miles et al. | |
| 7,061,481 B2 | 6/2006 | Tsuchiya | |
| 7,123,216 B1 | 10/2006 | Miles | |
| 7,327,510 B2 | 2/2008 | Cummings et al. | |
| 7,560,299 B2 | 7/2009 | Cummings | |
| 7,889,163 B2 | 2/2011 | Chui et al. | |
| 7,944,604 B2 | 5/2011 | Ganti et al. | |
| 7,990,604 B2 | 8/2011 | Lee et al. | |
| 2002/0024711 A1 | 2/2002 | Miles | |
| 2005/0030268 A1 | 2/2005 | Zhang et al. | |
| 2005/0122560 A1 | 6/2005 | Sampsell et al. | |
| 2005/0156923 A1 | 7/2005 | Nishimura | |
| 2006/0012585 A1* | 1/2006 | Schoofs et al. | 345/204 |
| 2006/0066594 A1 | 3/2006 | Tyger | |
| 2007/0002008 A1 | 1/2007 | Tam | |
| 2008/0273007 A1 | 11/2008 | Ng et al. | |
| 2008/0291122 A1 | 11/2008 | Smith et al. | |
| 2009/0251404 A1 | 10/2009 | Hwang et al. | |
| 2010/0079439 A1* | 4/2010 | Bar et al. | 345/212 |
| 2010/0085347 A1 | 4/2010 | Kawagoshi | |
| 2010/0201668 A1* | 8/2010 | Ko et al. | 345/211 |
| 2010/0245313 A1* | 9/2010 | Lewis et al. | 345/211 |
| 2010/0315021 A1* | 12/2010 | Lau et al. | 315/294 |
| 2010/0328295 A1* | 12/2010 | Piasecki et al. | 345/212 |
| 2011/0164009 A1 | 7/2011 | Van Lier et al. | |

FOREIGN PATENT DOCUMENTS

| | | | |
|---|---|---|---|
| EP | 1227464 | A2 | 7/2002 |
| FR | 2705817 | A1 | 12/1994 |
| TW | 201044009 | A | 12/2010 |
| WO | WO 98/00825 | | 1/1998 |
| WO | WO 2004/026757 | | 4/2004 |
| WO | WO-2009114323 | A1 | 9/2009 |

OTHER PUBLICATIONS

Taiwan Search Report—TW102119174—TIPO—Oct. 1, 2014.

* cited by examiner

Common Voltages

| Segment Voltages | $VC_{ADD\_H}$ | $VC_{HOLD\_H}$ | $VC_{REL}$ | $VC_{HOLD\_L}$ | $VC_{ADD\_L}$ |
|---|---|---|---|---|---|
| $VS_H$ | Stable | Stable | Relax | Stable | Actuate |
| $VS_L$ | Actuate | Stable | Relax | Stable | Stable |

CHARGE PUMP FOR PRODUCING DISPLAY DRIVER OUTPUT

CROSS-REFERENCE TO RELATED APPLICATIONS

This Patent Application claims priority to U.S. Provisional Patent Application No. 61/653,986 filed May 31, 2012 entitled "CHARGE PUMP FOR PRODUCING DISPLAY DRIVER OUTPUT," and assigned to the assignee hereof. The disclosure of the prior Application is considered part of and is incorporated by reference in this Patent Application.

TECHNICAL FIELD

This disclosure relates to methods and systems for driving electromechanical systems such as interferometric modulators.

DESCRIPTION OF THE RELATED TECHNOLOGY

Electromechanical systems (EMS) include devices having electrical and mechanical elements, actuators, transducers, sensors, optical components such as mirrors and optical films, and electronics. EMS devices or elements can be manufactured at a variety of scales including, but not limited to, microscales and nanoscales. For example, microelectromechanical systems (MEMS) devices can include structures having sizes ranging from about a micron to hundreds of microns or more. Nanoelectromechanical systems (NEMS) devices can include structures having sizes smaller than a micron including, for example, sizes smaller than several hundred nanometers. Electromechanical elements may be created using deposition, etching, lithography, and/or other micromachining processes that etch away parts of substrates and/or deposited material layers, or that add layers to form electrical and electromechanical devices.

One type of EMS device is called an interferometric modulator (IMOD). The term IMOD or interferometric light modulator refers to a device that selectively absorbs and/or reflects light using the principles of optical interference. In some implementations, an IMOD display element may include a pair of conductive plates, one or both of which may be transparent and/or reflective, wholly or in part, and capable of relative motion upon application of an appropriate electrical signal. For example, one plate may include a stationary layer deposited over, on or supported by a substrate and the other plate may include a reflective membrane separated from the stationary layer by an air gap. The position of one plate in relation to another can change the optical interference of light incident on the IMOD display element. IMOD-based display devices have a wide range of applications, and are anticipated to be used in improving existing products and creating new products, especially those with display capabilities. It would be beneficial in the art to utilize and/or modify the characteristics of these types of devices so that their features can be exploited in improving existing products and creating new products that have not yet been developed.

SUMMARY

The systems, methods and devices of this disclosure each have several innovative aspects, no single one of which is solely responsible for the desirable attributes disclosed herein.

One innovative aspect of the subject matter described in this disclosure can be implemented in a display driver circuit configured to drive a display array with a waveform having a plurality of voltages. A first subset of the plurality of voltages is different from a second subset of the plurality of voltages by a defined amount. In this implementation, the display driver circuit includes power supply circuitry configured to generate the first subset of the plurality of voltages and a charge pump having the first subset of plurality of voltages as inputs and the second subset of the plurality of voltages as outputs and including a separate boost capacitor for each of the second subset of the plurality of voltages. Each of the second subset of the plurality of voltages is directly connected to its corresponding boost capacitor.

In some implementations, at least some of the second subset of the plurality of voltages have a magnitude of at least 20 V. At least some of the second subset of the plurality of voltages can be routed to a switching circuit implemented on a separate integrated circuit for applying the voltages to common lines of a display array.

Another innovative aspect of the subject matter described in this disclosure can be implemented in a method of driving a display array with a waveform having a plurality of voltages, wherein a first subset of the plurality of voltages is different from a second subset of the plurality of voltages by a defined amount. The method may include generating the first subset of the plurality of voltages, generating the second subset of the plurality of voltages using a charge pump with switching circuits implemented on a first integrated circuit, the charge pump including a plurality of boost capacitors and having the first subset of plurality of voltages as inputs and said second subset of plurality of voltages as outputs. The method may further include directly routing voltages on output terminals of the boost capacitors to a switching circuit on a second integrated circuit without passing through a switch on the first integrated circuit.

Another innovative aspect of the subject matter described in this disclosure can be implemented in a display driver circuit configured to drive a display array with a waveform having a plurality of voltages, wherein a first subset of the plurality of voltages is different from a second subset of the plurality of voltages by a defined amount. In this implementation, display driver circuit includes means for generating the first subset of the plurality of voltages and means for generating the second subset of the plurality of voltages using a charge pump having the first subset of the plurality of voltages as inputs and the second subset of the plurality of voltages as outputs, and including a separate boost capacitor for each of the second subset of the plurality of voltages. In this implementation, each of the second subset of the plurality of voltages is directly connected to its corresponding boost capacitor.

Details of one or more implementations of the subject matter described in this disclosure are set forth in the accompanying drawings and the description below. Although the examples provided in this disclosure are primarily described in terms of EMS and MEMS-based displays the concepts provided herein may apply to other types of displays such as liquid crystal displays, organic light-emitting diode ("OLED") displays, and field emission displays. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
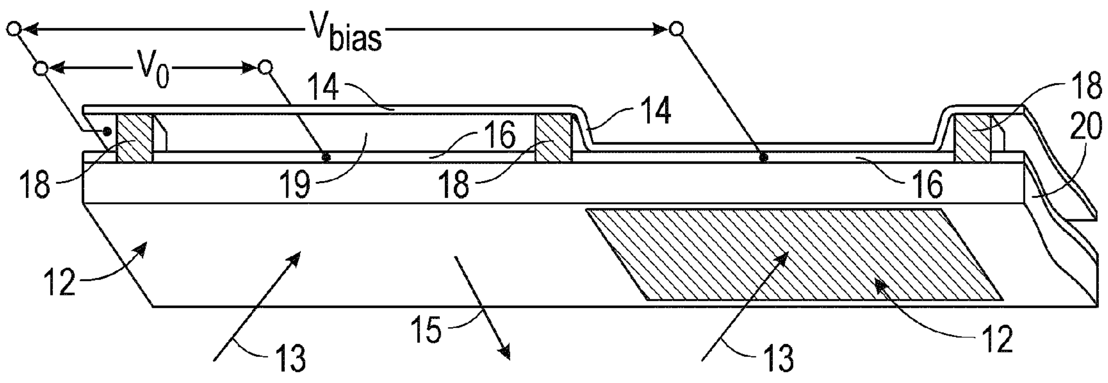
FIG. 1 is an isometric view illustration depicting two adjacent interferometric modulator (IMOD) display elements in a series or array of display elements of an IMOD display device.

The following description is directed to certain implementations for the purposes of describing the innovative aspects of this disclosure. However, a person having ordinary skill in the art will readily recognize that the teachings herein can be applied in a multitude of different ways. The described implementations may be implemented in any device, apparatus, or system that can be configured to display an image, whether in motion (such as video) or stationary (such as still images), and whether textual, graphical or pictorial. More particularly, it is contemplated that the described implementations may be included in or associated with a variety of electronic devices such as, but not limited to: mobile telephones, multimedia Internet enabled cellular telephones, mobile television receivers, wireless devices, smartphones, Bluetooth® devices, personal data assistants (PDAs), wireless electronic mail receivers, hand-held or portable computers, netbooks, notebooks, smartbooks, tablets, printers, copiers, scanners, facsimile devices, global positioning system (GPS) receivers/navigators, cameras, digital media players (such as MP3 players), camcorders, game consoles, wrist watches, clocks, calculators, television monitors, flat panel displays, electronic reading devices (e.g., e-readers), computer monitors, auto displays (including odometer and speedometer displays, etc.), cockpit controls and/or displays, camera view displays (such as the display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, parking meters, packaging (such as in electromechanical systems (EMS) applications including microelectromechanical systems (MEMS) applications, as well as non-EMS applications), aesthetic structures (such as display of images on a piece of jewelry or clothing) and a variety of EMS devices. The teachings herein also can be used in non-display applications such as, but not limited to, electronic switching devices, radio frequency filters, sensors, accelerometers, gyroscopes, motion-sensing devices, magnetometers, inertial components for consumer electronics, parts of consumer electronics products, varactors, liquid crystal devices, electrophoretic devices, drive schemes, manufacturing processes and electronic test equipment. Thus, the teachings are not intended to be limited to the implementations depicted solely in the Figures, but instead have wide applicability as will be readily apparent to one having ordinary skill in the art.

As displays based on electromechanical devices become larger, addressing of the entire display becomes more difficult, and a desired frame rate may be more difficult to achieve. A low voltage drive scheme, in which a given row of electromechanical devices is released before new information is written to the row, and in which the data information is conveyed using a smaller range of voltages, addresses these issues by allowing shorter line times. However, such a drive scheme uses multiple different voltages, which complicates the design of the power supply and requires more power to keep the power supply outputs available for display addressing. Simpler and more power efficient supply circuits are disclosed herein that derive some of the necessary outputs from other outputs at the required times.

An example of a suitable EMS or MEMS device or apparatus, to which the described implementations may apply, is a reflective display device. Reflective display devices can incorporate interferometric modulator (IMOD) display elements that can be implemented to selectively absorb and/or reflect light incident thereon using principles of optical interference. IMOD display elements can include a partial optical absorber, a reflector that is movable with respect to the absorber, and an optical resonant cavity defined between the absorber and the reflector. In some implementations, the reflector can be moved to two or more different positions, which can change the size of the optical resonant cavity and thereby affect the reflectance of the IMOD. The reflectance spectra of IMOD display elements can create fairly broad spectral bands that can be shifted across the visible wavelengths to generate different colors. The position of the spectral band can be adjusted by changing the thickness of the optical resonant cavity. One way of changing the optical resonant cavity is by changing the position of the reflector with respect to the absorber.

FIG. 1 is an isometric view illustration depicting two adjacent interferometric modulator (IMOD) display elements in a series or array of display elements of an IMOD display device. The IMOD display device includes one or more interferometric EMS, such as MEMS, display elements. In these devices, the interferometric MEMS display elements can be configured in either a bright or dark state. In the bright ("relaxed," "open" or "on," etc.) state, the display element reflects a large portion of incident visible light. Conversely, in the dark ("actuated," "closed" or "off," etc.) state, the display element reflects little incident visible light. MEMS display elements can be configured to reflect predominantly at particular wavelengths of light allowing for a color display in addition to black and white. In some implementations, by using multiple display elements, different intensities of color primaries and shades of gray can be achieved.

The IMOD display device can include an array of IMOD display elements which may be arranged in rows and columns. Each display element in the array can include at least a pair of reflective and semi-reflective layers, such as a movable reflective layer (i.e., a movable layer, also referred to as a mechanical layer) and a fixed partially reflective layer (i.e., a stationary layer), positioned at a variable and controllable distance from each other to form an air gap (also referred to as an optical gap, cavity or optical resonant cavity). The movable reflective layer may be moved between at least two positions. For example, in a first position, i.e., a relaxed position, the movable reflective layer can be positioned at a distance from the fixed partially reflective layer. In a second position, i.e., an actuated position, the movable reflective layer can be positioned more closely to the partially reflective layer. Incident light that reflects from the two layers can interfere constructively and/or destructively depending on the position of the movable reflective layer and the wavelength(s) of the incident light, producing either an overall reflective or non-reflective state for each display element. In some implementations, the display element may be in a reflective state when unactuated, reflecting light within the visible spectrum, and may be in a dark state when actuated, absorbing and/or destructively interfering light within the visible range. In some other implementations, however, an IMOD display element may be in a dark state when unactuated, and in a reflective state when actuated. In some implementations, the introduction of an applied voltage can drive the display elements to change states. In some other implementations, an applied charge can drive the display elements to change states.

The depicted portion of the array in FIG. 1 includes two adjacent interferometric MEMS display elements in the form of IMOD display elements 12. In the display element 12 on the right (as illustrated), the movable reflective layer 14 is illustrated in an actuated position near, adjacent or touching the optical stack 16. The voltage $V_{bias}$ applied across the display element 12 on the right is sufficient to move and also maintain the movable reflective layer 14 in the actuated position. In the display element 12 on the left (as illustrated), a movable reflective layer 14 is illustrated in a relaxed position at a distance (which may be predetermined based on design parameters) from an optical stack 16, which includes a partially reflective layer. The voltage $V_0$ applied across the display element 12 on the left is insufficient to cause actuation of the movable reflective layer 14 to an actuated position such as that of the display element 12 on the right.

In FIG. 1, the reflective properties of IMOD display elements 12 are generally illustrated with arrows indicating light 13 incident upon the IMOD display elements 12, and light 15 reflecting from the display element 12 on the left. Most of the light 13 incident upon the display elements 12 may be transmitted through the transparent substrate 20, toward the optical stack 16. A portion of the light incident upon the optical stack 16 may be transmitted through the partially reflective layer of the optical stack 16, and a portion will be reflected back through the transparent substrate 20. The portion of light 13 that is transmitted through the optical stack 16 may be reflected from the movable reflective layer 14, back toward (and through) the transparent substrate 20. Interference (constructive and/or destructive) between the light reflected from the partially reflective layer of the optical stack 16 and the light reflected from the movable reflective layer 14 will determine in part the intensity of wavelength(s) of light 15 reflected from the display element 12 on the viewing or substrate side of the device. In some implementations, the transparent substrate 20 can be a glass substrate (sometimes referred to as a glass plate or panel). The glass substrate may be or include, for example, a borosilicate glass, a soda lime glass, quartz, Pyrex, or other suitable glass material. In some implementations, the glass substrate may have a thickness of 0.3, 0.5 or 0.7 millimeters, although in some implementations the glass substrate can be thicker (such as tens of millimeters) or thinner (such as less than 0.3 millimeters). In some implementations, a non-glass substrate can be used, such as a polycarbonate, acrylic, polyethylene terephthalate (PET) or polyether ether ketone (PEEK) substrate. In such an implementation, the non-glass substrate will likely have a thickness of less than 0.7 millimeters, although the substrate may be thicker depending on the design considerations. In some implementations, a non-transparent substrate, such as a metal foil or stainless steel-based substrate can be used. For example, a reverse-IMOD-based display, which includes a fixed reflective layer and a movable layer which is partially transmissive and partially reflective, may be configured to be viewed from the opposite side of a substrate as the display elements 12 of FIG. 1 and may be supported by a non-transparent substrate.

The optical stack 16 can include a single layer or several layers. The layer(s) can include one or more of an electrode layer, a partially reflective and partially transmissive layer, and a transparent dielectric layer. In some implementations, the optical stack 16 is electrically conductive, partially transparent and partially reflective, and may be fabricated, for example, by depositing one or more of the above layers onto a transparent substrate 20. The electrode layer can be formed from a variety of materials, such as various metals, for example indium tin oxide (ITO). The partially reflective layer can be formed from a variety of materials that are partially reflective, such as various metals (e.g., chromium and/or molybdenum), semiconductors, and dielectrics. The partially reflective layer can be formed of one or more layers of materials, and each of the layers can be formed of a single material or a combination of materials. In some implementations, certain portions of the optical stack 16 can include a single semi-transparent thickness of metal or semiconductor which serves as both a partial optical absorber and electrical conductor, while different, electrically more conductive layers or portions (e.g., of the optical stack 16 or of other structures of the display element) can serve to bus signals between IMOD display elements. The optical stack 16 also can include one or more insulating or dielectric layers covering one or more conductive layers or an electrically conductive/partially absorptive layer.

In some implementations, at least some of the layer(s) of the optical stack 16 can be patterned into parallel strips, and may form row electrodes in a display device as described further below. As will be understood by one having ordinary skill in the art, the term "patterned" is used herein to refer to masking as well as etching processes. In some implementations, a highly conductive and reflective material, such as aluminum (Al), may be used for the movable reflective layer 14, and these strips may form column electrodes in a display device. The movable reflective layer 14 may be formed as a series of parallel strips of a deposited metal layer or layers (orthogonal to the row electrodes of the optical stack 16) to form columns deposited on top of supports, such as the illustrated posts 18, and an intervening sacrificial material located between the posts 18. When the sacrificial material is etched away, a defined gap 19, or optical cavity, can be formed between the movable reflective layer 14 and the optical stack 16. In some implementations, the spacing between posts 18 may be approximately 1-1000 μm, while the gap 19 may be approximately less than 10,000 Angstroms (Å).

In some implementations, each IMOD display element, whether in the actuated or relaxed state, can be considered as a capacitor formed by the fixed and moving reflective layers. When no voltage is applied, the movable reflective layer 14 remains in a mechanically relaxed state, as illustrated by the display element 12 on the left in FIG. 1, with the gap 19 between the movable reflective layer 14 and optical stack 16. However, when a potential difference, i.e., a voltage, is applied to at least one of a selected row and column, the capacitor formed at the intersection of the row and column electrodes at the corresponding display element becomes charged, and electrostatic forces pull the electrodes together. If the applied voltage exceeds a threshold, the movable reflective layer 14 can deform and move near or against the optical stack 16. A dielectric layer (not shown) within the optical stack 16 may prevent shorting and control the separation distance between the layers 14 and 16, as illustrated by the actuated display element 12 on the right in FIG. 1. The behavior can be the same regardless of the polarity of the applied potential difference. Though a series of display elements in an array may be referred to in some instances as "rows" or "columns," a person having ordinary skill in the art will readily understand that referring to one direction as a "row" and another as a "column" is arbitrary. Restated, in some orientations, the rows can be considered columns, and the columns considered to be rows. In some implementations, the rows may be referred to as "common" lines and the columns may be referred to as "segment" lines, or vice versa. Furthermore, the display elements may be evenly arranged in orthogonal rows and columns (an "array"), or arranged in non-linear configurations, for example, having certain positional offsets with respect to one another (a "mosaic"). The terms "array" and "mosaic" may refer to either configuration. Thus, although the display is referred to as including an "array" or "mosaic," the elements themselves need not be arranged orthogonally to one another, or disposed in an even distribution, in any instance, but may include arrangements having asymmetric shapes and unevenly distributed elements.

Figure 2:
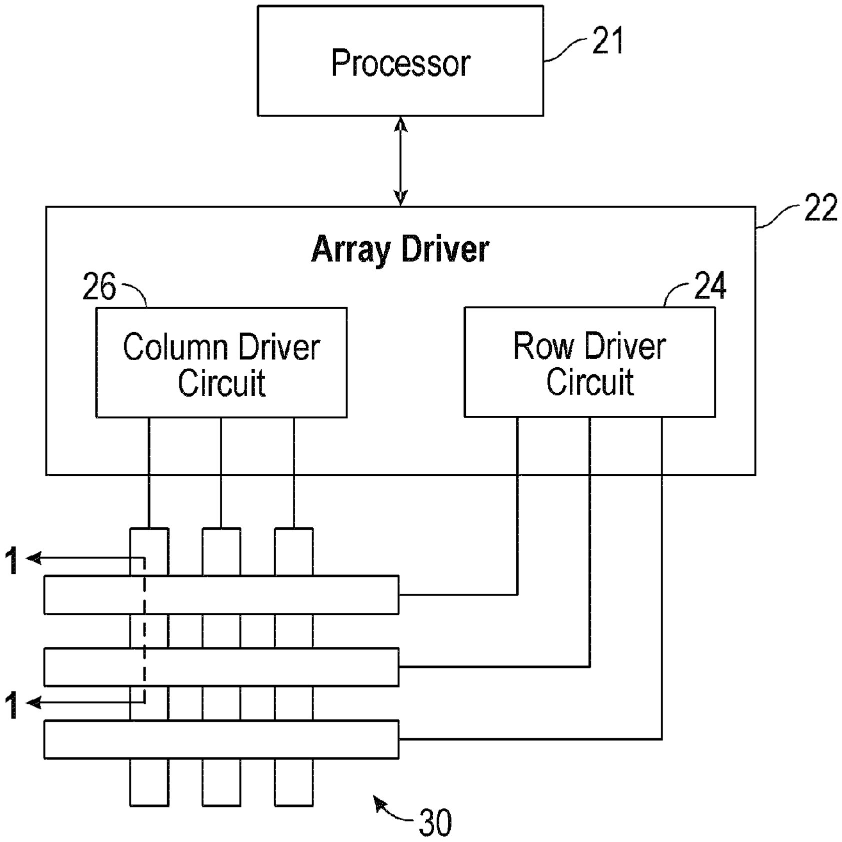
FIG. 2 is a system block diagram illustrating an electronic device incorporating an IMOD-based display including a three element by three element array of IMOD display elements.

FIG. 2 is a system block diagram illustrating an electronic device incorporating an IMOD-based display including a three element by three element array of IMOD display elements. The electronic device includes a processor 21 that may be configured to execute one or more software modules. In addition to executing an operating system, the processor 21 may be configured to execute one or more software applications, including a web browser, a telephone application, an email program, or any other software application.

The processor 21 can be configured to communicate with an array driver 22. The array driver 22 can include a row driver circuit 24 and a column driver circuit 26 that provide signals to, for example a display array or panel 30. The cross section of the IMOD display device illustrated in FIG. 1 is shown by the lines 1-1 in FIG. 2. Although FIG. 2 illustrates a 3×3 array of IMOD display elements for the sake of clarity, the display array 30 may contain a very large number of IMOD display elements, and may have a different number of IMOD display elements in rows than in columns, and vice versa.

Figures 3, 4:
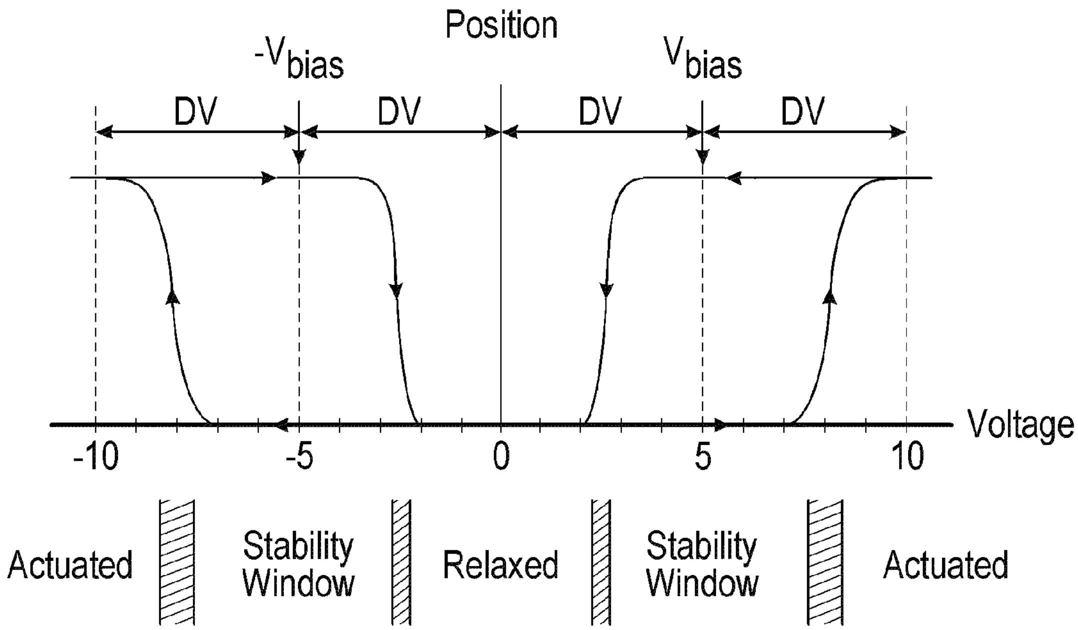
FIG. 3 is a graph illustrating movable reflective layer position versus applied voltage for an IMOD display element.
FIG. 4 is a table illustrating various states of an IMOD display element when various common and segment voltages are applied.

FIG. 3 is a graph illustrating movable reflective layer position versus applied voltage for an IMOD display element. For IMODs, the row/column (i.e., common/segment) write procedure may take advantage of a hysteresis property of the display elements as illustrated in FIG. 3. An IMOD display element may use, in one example implementation, about a 10-volt potential difference to cause the movable reflective layer, or mirror, to change from the relaxed state to the actuated state. When the voltage is reduced from that value, the movable reflective layer maintains its state as the voltage drops back below, in this example, 10 volts, however, the movable reflective layer does not relax completely until the voltage drops below 2 volts. Thus, a range of voltage, approximately 3-7 volts, in the example of FIG. 3, exists where there is a window of applied voltage within which the element is stable in either the relaxed or actuated state. This is referred to herein as the "hysteresis window" or "stability window." For a display array 30 having the hysteresis characteristics of FIG. 3, the row/column write procedure can be designed to address one or more rows at a time. Thus, in this example, during the addressing of a given row, display elements that are to be actuated in the addressed row can be exposed to a voltage difference of about 10 volts, and display elements that are to be relaxed can be exposed to a voltage difference of near zero volts. After addressing, the display elements can be exposed to a steady state or bias voltage difference of approximately 5 volts in this example, such that they remain in the previously strobed, or written, state. In this example, after being addressed, each display element sees a potential difference within the "stability window" of about 3-7 volts. This hysteresis property feature enables the IMOD display element design to remain stable in either an actuated or relaxed pre-existing state under the same applied voltage conditions. Since each IMOD display element, whether in the actuated or relaxed state, can serve as a capacitor formed by the fixed and moving reflective layers, this stable state can be held at a steady voltage within the hysteresis window without substantially consuming or losing power. Moreover, essentially little or no current flows into the display element if the applied voltage potential remains substantially fixed.

In some implementations, a frame of an image may be created by applying data signals in the form of "segment" voltages along the set of column electrodes, in accordance with the desired change (if any) to the state of the display elements in a given row. Each row of the array can be addressed in turn, such that the frame is written one row at a time. To write the desired data to the display elements in a first row, segment voltages corresponding to the desired state of the display elements in the first row can be applied on the column electrodes, and a first row pulse in the form of a specific "common" voltage or signal can be applied to the first row electrode. The set of segment voltages can then be changed to correspond to the desired change (if any) to the state of the display elements in the second row, and a second common voltage can be applied to the second row electrode.

In some implementations, the display elements in the first row are unaffected by the change in the segment voltages applied along the column electrodes, and remain in the state they were set to during the first common voltage row pulse. This process may be repeated for the entire series of rows, or alternatively, columns, in a sequential fashion to produce the image frame. The frames can be refreshed and/or updated with new image data by continually repeating this process at some desired number of frames per second.

The combination of segment and common signals applied across each display element (that is, the potential difference across each display element or pixel) determines the resulting state of each display element. FIG. 4 is a table illustrating various states of an IMOD display element when various common and segment voltages are applied. As will be readily understood by one having ordinary skill in the art, the "segment" voltages can be applied to either the column electrodes or the row electrodes, and the "common" voltages can be applied to the other of the column electrodes or the row electrodes.

As illustrated in FIG. 4, when a release voltage $VC_{REL}$ is applied along a common line, all IMOD display elements along the common line will be placed in a relaxed state, alternatively referred to as a released or unactuated state, regardless of the voltage applied along the segment lines, i.e., high segment voltage $VS_H$ and low segment voltage $VS_L$. In particular, when the release voltage $VC_{REL}$ is applied along a common line, the potential voltage across the modulator display elements or pixels (alternatively referred to as a display element or pixel voltage) can be within the relaxation window (see FIG. 3, also referred to as a release window) both when the high segment voltage $VS_H$ and the low segment voltage $VS_L$ are applied along the corresponding segment line for that display element.

When a hold voltage is applied on a common line, such as a high hold voltage $VC_{HOLD\_H}$ or a low hold voltage $VC_{HOLD\_L}$, the state of the IMOD display element along that common line will remain constant. For example, a relaxed IMOD display element will remain in a relaxed position, and an actuated IMOD display element will remain in an actuated position. The hold voltages can be selected such that the display element voltage will remain within a stability window both when the high segment voltage $VS_H$ and the low segment voltage $VS_L$ are applied along the corresponding segment line. Thus, the segment voltage swing in this example is the difference between the high $VS_H$ and low segment voltage $VS_L$, and is less than the width of either the positive or the negative stability window.

When an addressing, or actuation, voltage is applied on a common line, such as a high addressing voltage $VC_{ADD\_H}$ or a low addressing voltage $VC_{ADD\_L}$, data can be selectively written to the modulators along that common line by application of segment voltages along the respective segment lines. The segment voltages may be selected such that actuation is dependent upon the segment voltage applied. When an addressing voltage is applied along a common line, application of one segment voltage will result in a display element voltage within a stability window, causing the display element to remain unactuated. In contrast, application of the other segment voltage will result in a display element voltage beyond the stability window, resulting in actuation of the display element. The particular segment voltage which causes actuation can vary depending upon which addressing voltage is used. In some implementations, when the high addressing voltage $VC_{ADD\_H}$ is applied along the common line, application of the high segment voltage $VS_H$ can cause a modulator to remain in its current position, while application of the low segment voltage $VS_L$ can cause actuation of the modulator. As a corollary, the effect of the segment voltages can be the opposite when a low addressing voltage $VC_{ADD\_L}$ is applied, with high segment voltage $VS_H$ causing actuation of the modulator, and low segment voltage $VS_L$ having substantially no effect (i.e., remaining stable) on the state of the modulator.

In some implementations, hold voltages, address voltages, and segment voltages may be used which produce the same polarity potential difference across the modulators. In some other implementations, signals can be used which alternate the polarity of the potential difference of the modulators from time to time. Alternation of the polarity across the modulators (that is, alternation of the polarity of write procedures) may reduce or inhibit charge accumulation that could occur after repeated write operations of a single polarity.

Figure 5A:
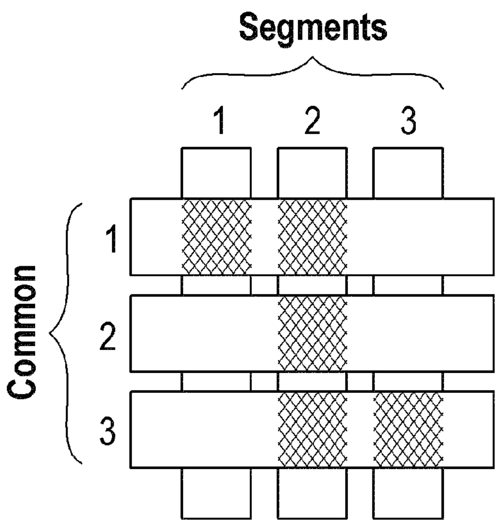
FIG. 5A is an illustration of a frame of display data in a three element by three element array of IMOD display elements displaying an image.
Figure 5B:
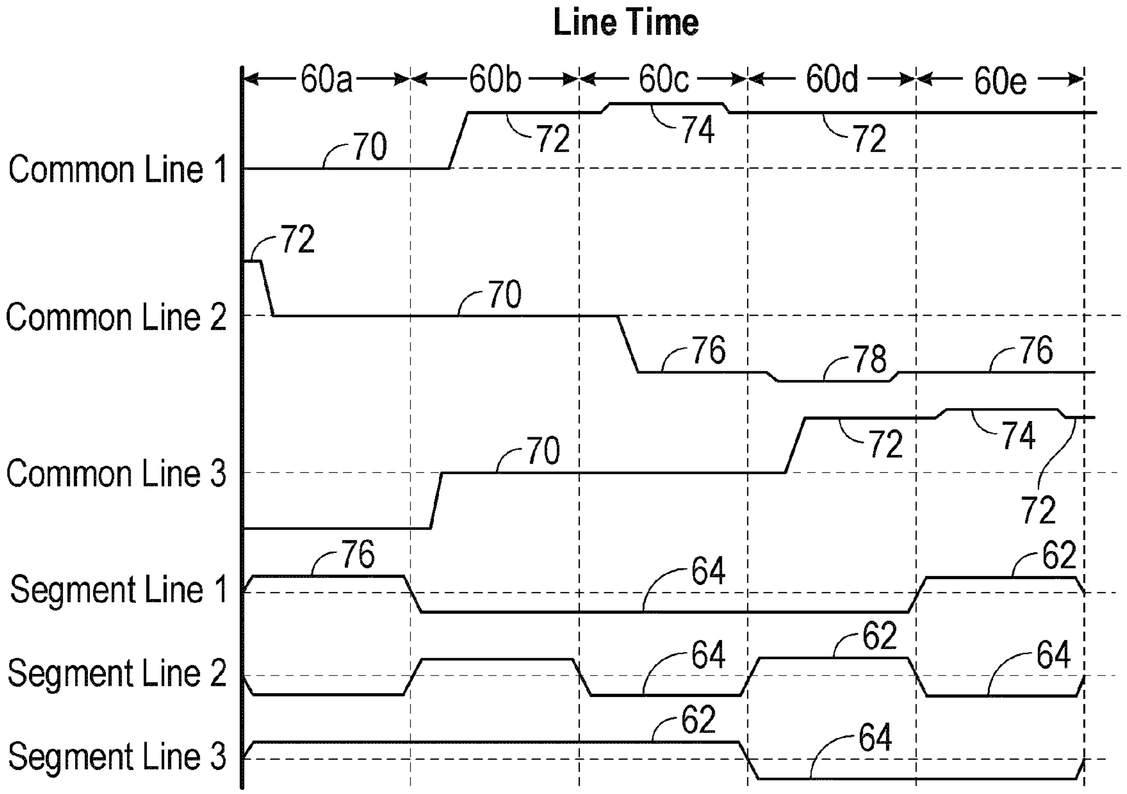
FIG. 5B is a timing diagram for common and segment signals that may be used to write data to the display elements illustrated in FIG. 5A.

FIG. 5A is an illustration of a frame of display data in a three element by three element array of IMOD display elements displaying an image. FIG. 5B is a timing diagram for common and segment signals that may be used to write data to the display elements illustrated in FIG. 5A. The actuated IMOD display elements in FIG. 5A, shown by darkened checkered patterns, are in a dark-state, i.e., where a substantial portion of the reflected light is outside of the visible spectrum so as to result in a dark appearance to, for example, a viewer. Each of the unactuated IMOD display elements reflect a color corresponding to their interferometric cavity gap heights. Prior to writing the frame illustrated in FIG. 5A, the display elements can be in any state, but the write procedure illustrated in the timing diagram of FIG. 5B presumes that each modulator has been released and resides in an unactuated state before the first line time 60*a*.

During the first line time 60*a*: a release voltage 70 is applied on common line 1; the voltage applied on common line 2 begins at a high hold voltage 72 and moves to a release voltage 70; and a low hold voltage 76 is applied along common line 3. Thus, the modulators (common 1, segment 1), (1,2) and (1,3) along common line 1 remain in a relaxed, or unactuated, state for the duration of the first line time 60*a*, the modulators (2,1), (2,2) and (2,3) along common line 2 will move to a relaxed state, and the modulators (3,1), (3,2) and (3,3) along common line 3 will remain in their previous state. In some implementations, the segment voltages applied along segment lines 1, 2 and 3 will have no effect on the state of the IMOD display elements, as none of common lines 1, 2 or 3 are being exposed to voltage levels causing actuation during line time 60*a* (i.e., $VC_{REL}$—relax and $VC_{HOLD\_L}$—stable).

During the second line time 60*b*, the voltage on common line 1 moves to a high hold voltage 72, and all modulators along common line 1 remain in a relaxed state regardless of the segment voltage applied because no addressing, or actuation, voltage was applied on the common line 1. The modulators along common line 2 remain in a relaxed state due to the application of the release voltage 70, and the modulators (3,1), (3,2) and (3,3) along common line 3 will relax when the voltage along common line 3 moves to a release voltage 70.

During the third line time 60*c*, common line 1 is addressed by applying a high address voltage 74 on common line 1. Because a low segment voltage 64 is applied along segment lines 1 and 2 during the application of this address voltage, the display element voltage across modulators (1,1) and (1,2) is greater than the high end of the positive stability window (i.e., the voltage differential exceeded a characteristic threshold) of the modulators, and the modulators (1,1) and (1,2) are actuated. Conversely, because a high segment voltage 62 is applied along segment line 3, the display element voltage across modulator (1,3) is less than that of modulators (1,1)

and (1,2), and remains within the positive stability window of the modulator; modulator (1,3) thus remains relaxed. Also during line time 60*c*, the voltage along common line 2 decreases to a low hold voltage 76, and the voltage along common line 3 remains at a release voltage 70, leaving the modulators along common lines 2 and 3 in a relaxed position.

During the fourth line time 60*d*, the voltage on common line 1 returns to a high hold voltage 72, leaving the modulators along common line 1 in their respective addressed states. The voltage on common line 2 is decreased to a low address voltage 78. Because a high segment voltage 62 is applied along segment line 2, the display element voltage across modulator (2,2) is below the lower end of the negative stability window of the modulator, causing the modulator (2,2) to actuate. Conversely, because a low segment voltage 64 is applied along segment lines 1 and 3, the modulators (2,1) and (2,3) remain in a relaxed position. The voltage on common line 3 increases to a high hold voltage 72, leaving the modulators along common line 3 in a relaxed state. Then, the voltage on common line 2 transitions back to the low hold voltage 76.

Finally, during the fifth line time 60*e*, the voltage on common line 1 remains at high hold voltage 72, and the voltage on common line 2 remains at the low hold voltage 76, leaving the modulators along common lines 1 and 2 in their respective addressed states. The voltage on common line 3 increases to a high address voltage 74 to address the modulators along common line 3. As a low segment voltage 64 is applied on segment lines 2 and 3, the modulators (3,2) and (3,3) actuate, while the high segment voltage 62 applied along segment line 1 causes modulator (3,1) to remain in a relaxed position. Thus, at the end of the fifth line time 60*e*, the 3×3 display element array is in the state shown in FIG. 5A, and will remain in that state as long as the hold voltages are applied along the common lines, regardless of variations in the segment voltage which may occur when modulators along other common lines (not shown) are being addressed.

In the timing diagram of FIG. 5B, a given write procedure (i.e., line times 60*a*-60*e*) can include the use of either high hold and address voltages, or low hold and address voltages. Once the write procedure has been completed for a given common line (and the common voltage is set to the hold voltage having the same polarity as the actuation voltage), the display element voltage remains within a given stability window, and does not pass through the relaxation window until a release voltage is applied on that common line. Furthermore, as each modulator is released as part of the write procedure prior to addressing the modulator, the actuation time of a modulator, rather than the release time, may determine the line time. Specifically, in implementations in which the release time of a modulator is greater than the actuation time, the release voltage may be applied for longer than a single line time, as depicted in FIG. 5A. In some other implementations, voltages applied along common lines or segment lines may vary to account for variations in the actuation and release voltages of different modulators, such as modulators of different colors.

Figure 6A:
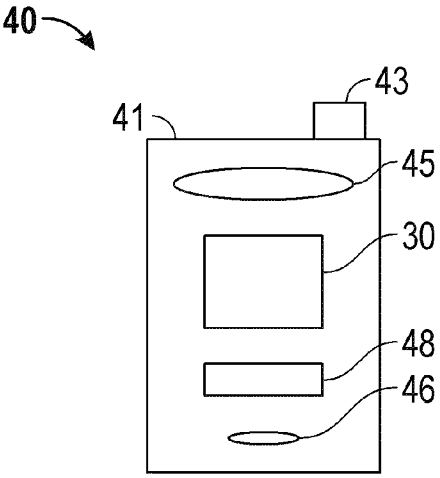
FIGS. 6A and 6B are system block diagrams illustrating a display device that includes a plurality of IMOD display elements.
Figure 6B:
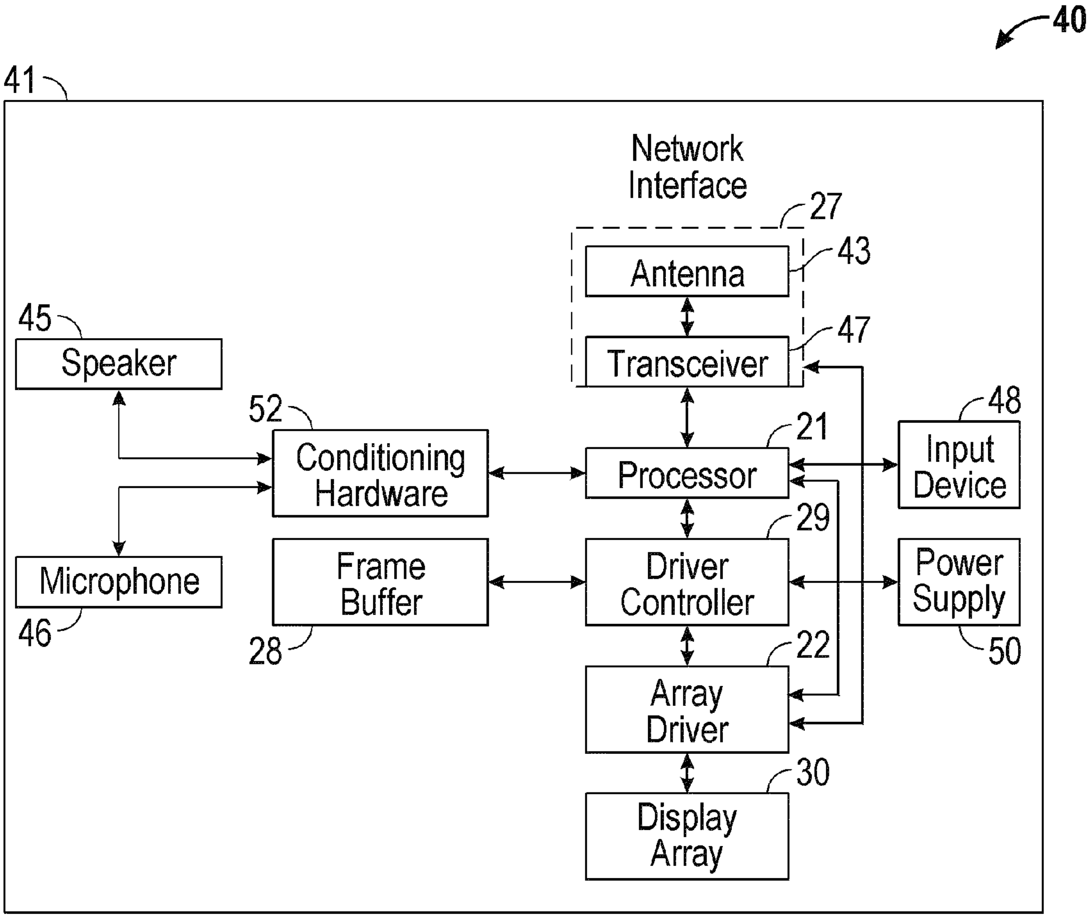

FIGS. 6A and 6B are system block diagrams illustrating a display device 40 that includes a plurality of IMOD display elements. The display device 40 can be, for example, a smart phone, a cellular or mobile telephone. However, the same components of the display device 40 or slight variations thereof are also illustrative of various types of display devices such as televisions, computers, tablets, e-readers, hand-held devices and portable media devices.

The display device 40 includes a housing 41, a display 30, an antenna 43, a speaker 45, an input device 48 and a microphone 46. The housing 41 can be formed from any of a variety of manufacturing processes, including injection molding, and vacuum forming. In addition, the housing 41 may be made from any of a variety of materials, including, but not limited to: plastic, metal, glass, rubber and ceramic, or a combination thereof. The housing 41 can include removable portions (not shown) that may be interchanged with other removable portions of different color, or containing different logos, pictures, or symbols.

The display 30 may be any of a variety of displays, including a bi-stable or analog display, as described herein. The display 30 also can be configured to include a flat-panel display, such as plasma, EL, OLED, STN LCD, or TFT LCD, or a non-flat-panel display, such as a CRT or other tube device. In addition, the display 30 can include an IMOD-based display, as described herein.

The components of the display device 40 are schematically illustrated in FIG. 6A. The display device 40 includes a housing 41 and can include additional components at least partially enclosed therein. For example, the display device 40 includes a network interface 27 that includes an antenna 43 which can be coupled to a transceiver 47. The network interface 27 may be a source for image data that could be displayed on the display device 40. Accordingly, the network interface 27 is one example of an image source module, but the processor 21 and the input device 48 also may serve as an image source module. The transceiver 47 is connected to a processor 21, which is connected to conditioning hardware 52. The conditioning hardware 52 may be configured to condition a signal (such as filter or otherwise manipulate a signal). The conditioning hardware 52 can be connected to a speaker 45 and a microphone 46. The processor 21 also can be connected to an input device 48 and a driver controller 29. The driver controller 29 can be coupled to a frame buffer 28, and to an array driver 22, which in turn can be coupled to a display array 30. One or more elements in the display device 40, including elements not specifically depicted in FIG. 6A, can be configured to function as a memory device and be configured to communicate with the processor 21. In some implementations, a power supply 50 can provide power to substantially all components in the particular display device 40 design.

The network interface 27 includes the antenna 43 and the transceiver 47 so that the display device 40 can communicate with one or more devices over a network. The network interface 27 also may have some processing capabilities to relieve, for example, data processing requirements of the processor 21. The antenna 43 can transmit and receive signals. In some implementations, the antenna 43 transmits and receives RF signals according to the IEEE 16.11 standard, including IEEE 16.11(a), (b), or (g), or the IEEE 802.11 standard, including IEEE 802.11a, b, g, n, and further implementations thereof. In some other implementations, the antenna 43 transmits and receives RF signals according to the Bluetooth® standard. In the case of a cellular telephone, the antenna 43 can be designed to receive code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HS-DPA), High Speed Uplink Packet Access (HSUPA), Evolved High Speed Packet Access (HSPA+), Long Term Evolution (LTE), AMPS, or other known signals that are used to communicate within a wireless network, such as a system utilizing 3G, 4G or 5G technology. The transceiver 47 can pre-process the signals received from the antenna 43 so that they may be received by and further manipulated by the processor 21. The transceiver 47 also can process signals received from the processor 21 so that they may be transmitted from the display device 40 via the antenna 43.

In some implementations, the transceiver 47 can be replaced by a receiver. In addition, in some implementations, the network interface 27 can be replaced by an image source, which can store or generate image data to be sent to the processor 21. The processor 21 can control the overall operation of the display device 40. The processor 21 receives data, such as compressed image data from the network interface 27 or an image source, and processes the data into raw image data or into a format that can be readily processed into raw image data. The processor 21 can send the processed data to the driver controller 29 or to the frame buffer 28 for storage. Raw data typically refers to the information that identifies the image characteristics at each location within an image. For example, such image characteristics can include color, saturation and gray-scale level.

The processor 21 can include a microcontroller, CPU, or logic unit to control operation of the display device 40. The conditioning hardware 52 may include amplifiers and filters for transmitting signals to the speaker 45, and for receiving signals from the microphone 46. The conditioning hardware 52 may be discrete components within the display device 40, or may be incorporated within the processor 21 or other components.

The driver controller 29 can take the raw image data generated by the processor 21 either directly from the processor 21 or from the frame buffer 28 and can re-format the raw image data appropriately for high speed transmission to the array driver 22. In some implementations, the driver controller 29 can re-format the raw image data into a data flow having a raster-like format, such that it has a time order suitable for scanning across the display array 30. Then the driver controller 29 sends the formatted information to the array driver 22. Although a driver controller 29, such as an LCD controller, is often associated with the system processor 21 as a stand-alone Integrated Circuit (IC), such controllers may be implemented in many ways. For example, controllers may be embedded in the processor 21 as hardware, embedded in the processor 21 as software, or fully integrated in hardware with the array driver 22.

The array driver 22 can receive the formatted information from the driver controller 29 and can re-format the video data into a parallel set of waveforms that are applied many times per second to the hundreds, and sometimes thousands (or more), of leads coming from the display's x-y matrix of display elements.

In some implementations, the driver controller 29, the array driver 22, and the display array 30 are appropriate for any of the types of displays described herein. For example, the driver controller 29 can be a conventional display controller or a bi-stable display controller (such as an IMOD display element controller). Additionally, the array driver 22 can be a conventional driver or a bi-stable display driver (such as an IMOD display element driver). Moreover, the display array 30 can be a conventional display array or a bi-stable display array (such as a display including an array of IMOD display elements). In some implementations, the driver controller 29 can be integrated with the array driver 22. Such an implementation can be useful in highly integrated systems, for example, mobile phones, portable-electronic devices, watches or small-area displays.

In some implementations, the input device 48 can be configured to allow, for example, a user to control the operation of the display device 40. The input device 48 can include a keypad, such as a QWERTY keyboard or a telephone keypad, a button, a switch, a rocker, a touch-sensitive screen, a touch-sensitive screen integrated with the display array 30, or a pressure- or heat-sensitive membrane. The microphone 46 can be configured as an input device for the display device 40. In some implementations, voice commands through the microphone 46 can be used for controlling operations of the display device 40.

The power supply 50 can include a variety of energy storage devices. For example, the power supply 50 can be a rechargeable battery, such as a nickel-cadmium battery or a lithium-ion battery. In implementations using a rechargeable battery, the rechargeable battery may be chargeable using power coming from, for example, a wall socket or a photovoltaic device or array. Alternatively, the rechargeable battery can be wirelessly chargeable. The power supply 50 also can be a renewable energy source, a capacitor, or a solar cell, including a plastic solar cell or solar-cell paint. The power supply 50 also can be configured to receive power from a wall outlet.

In some implementations, control programmability resides in the driver controller 29 which can be located in several places in the electronic display system. In some other implementations, control programmability resides in the array driver 22. The above-described optimization may be implemented in any number of hardware and/or software components and in various configurations.

Figure 7A:
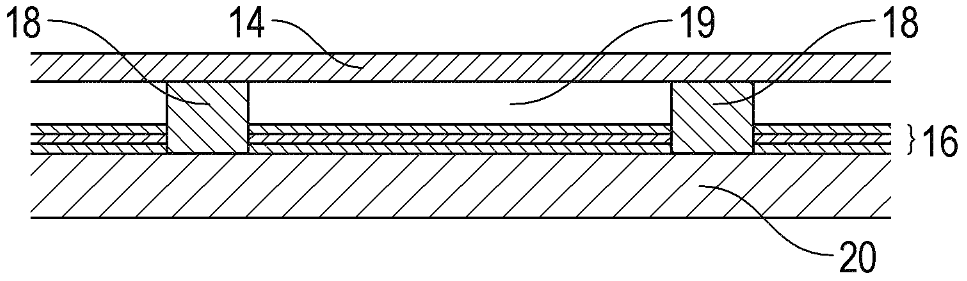
FIGS. 7A-7E are cross-sectional illustrations of varying implementations of IMOD display elements.
Figure 7B:
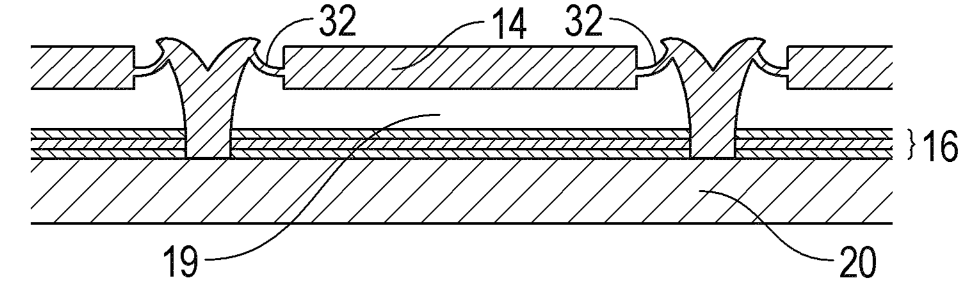
Figure 7C:
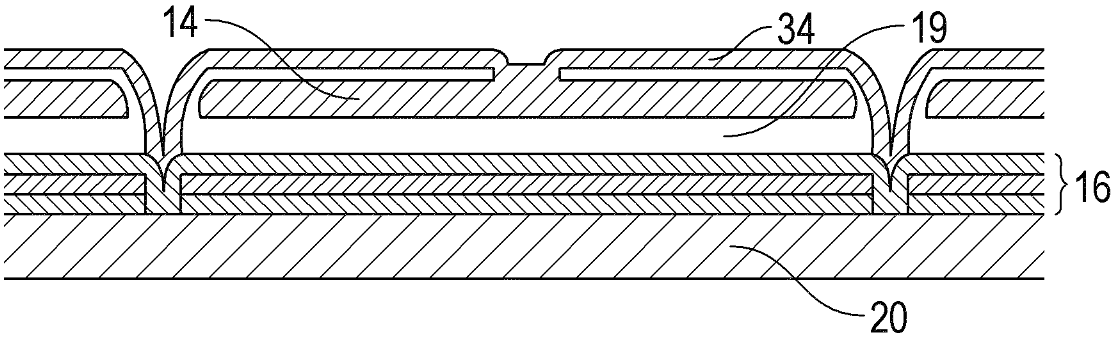

The details of the structure of IMOD displays and display elements may vary widely. FIGS. 7A-7E are cross-sectional illustrations of varying implementations of IMOD display elements. FIG. 7A is a cross-sectional illustration of an IMOD display element, where a strip of metal material is deposited on supports 18 extending generally orthogonally from the substrate 20 forming the movable reflective layer 14. In FIG. 7B, the movable reflective layer 14 of each IMOD display element is generally square or rectangular in shape and attached to supports at or near the corners, on tethers 32. In FIG. 7C, the movable reflective layer 14 is generally square or rectangular in shape and suspended from a deformable layer 34, which may include a flexible metal. The deformable layer 34 can connect, directly or indirectly, to the substrate 20 around the perimeter of the movable reflective layer 14. These connections are herein referred to as implementations of "integrated" supports or support posts 18. The implementation shown in FIG. 7C has additional benefits deriving from the decoupling of the optical functions of the movable reflective layer 14 from its mechanical functions, the latter of which are carried out by the deformable layer 34. This decoupling allows the structural design and materials used for the movable reflective layer 14 and those used for the deformable layer 34 to be optimized independently of one another.

Figure 7D:
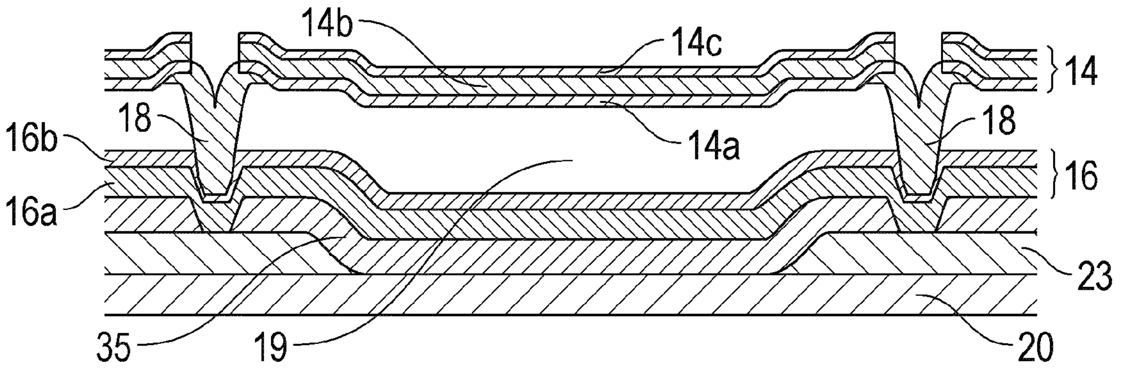

FIG. 7D is another cross-sectional illustration of an IMOD display element, where the movable reflective layer 14 includes a reflective sub-layer 14*a*. The movable reflective layer 14 rests on a support structure, such as support posts 18. The support posts 18 provide separation of the movable reflective layer 14 from the lower stationary electrode, which can be part of the optical stack 16 in the illustrated IMOD display element. For example, a gap 19 is formed between the movable reflective layer 14 and the optical stack 16, when the movable reflective layer 14 is in a relaxed position. The movable reflective layer 14 also can include a conductive layer 14*c*, which may be configured to serve as an electrode, and a support layer 14*b*. In this example, the conductive layer 14*c* is disposed on one side of the support layer 14*b*, distal from the substrate 20, and the reflective sub-layer 14*a* is disposed on the other side of the support layer 14*b*, proximal to the substrate 20. In some implementations, the reflective sub-layer 14*a* can be conductive and can be disposed between the support layer 14*b* and the optical stack 16. The support layer 14*b* can include one or more layers of a dielectric material, for example, silicon oxynitride (SiON) or silicon dioxide ($SiO_2$). In some implementations, the support layer 14*b* can be a stack of layers, such as, for example, a $SiO_2$/SiON/$SiO_2$ tri-layer stack. Either or both of the reflective sub-layer 14*a* and the conductive layer 14*c* can include, for example, an aluminum (Al) alloy with about 0.5% copper (Cu), or another reflective metallic material. Employing conductive layers 14*a* and 14*c* above and below the dielectric support layer 14*b* can balance stresses and provide enhanced conduction. In some implementations, the reflective sub-layer 14*a* and the conductive layer 14*c* can be formed of different materials for a variety of design purposes, such as achieving specific stress profiles within the movable reflective layer 14.

As illustrated in FIG. 7D, some implementations also can include a black mask structure 23, or dark film layers. The black mask structure 23 can be formed in optically inactive regions (such as between display elements or under the support posts 18) to absorb ambient or stray light. The black mask structure 23 also can improve the optical properties of a display device by inhibiting light from being reflected from or transmitted through inactive portions of the display, thereby increasing the contrast ratio. Additionally, at least some portions of the black mask structure 23 can be conductive and be configured to function as an electrical bussing layer. In some implementations, the row electrodes can be connected to the black mask structure 23 to reduce the resistance of the connected row electrode. The black mask structure 23 can be formed using a variety of methods, including deposition and patterning techniques. The black mask structure 23 can include one or more layers. In some implementations, the black mask structure 23 can be an etalon or interferometric stack structure. For example, in some implementations, the interferometric stack black mask structure 23 includes a molybdenum-chromium (MoCr) layer that serves as an optical absorber, an $SiO_2$ layer, and an aluminum alloy that serves as a reflector and a bussing layer, with a thickness in the range of about 30-80 Å, 500-1000 Å, and 500-6000 Å, respectively. The one or more layers can be patterned using a variety of techniques, including photolithography and dry etching, including, for example, tetrafluoromethane (or carbon tetrafluoride, $CF_4$) and/or oxygen ($O_2$) for the MoCr and $SiO_2$ layers and chlorine ($Cl_2$) and/or boron trichloride ($BCl_3$) for the aluminum alloy layer. In such interferometric stack black mask structures 23, the conductive absorbers can be used to transmit or bus signals between lower, stationary electrodes in the optical stack 16 of each row or column. In some implementations, a spacer layer 35 can serve to generally electrically isolate electrodes (or conductors) in the optical stack 16 (such as the absorber layer 16*a*) from the conductive layers in the black mask structure 23.

Figure 7E:
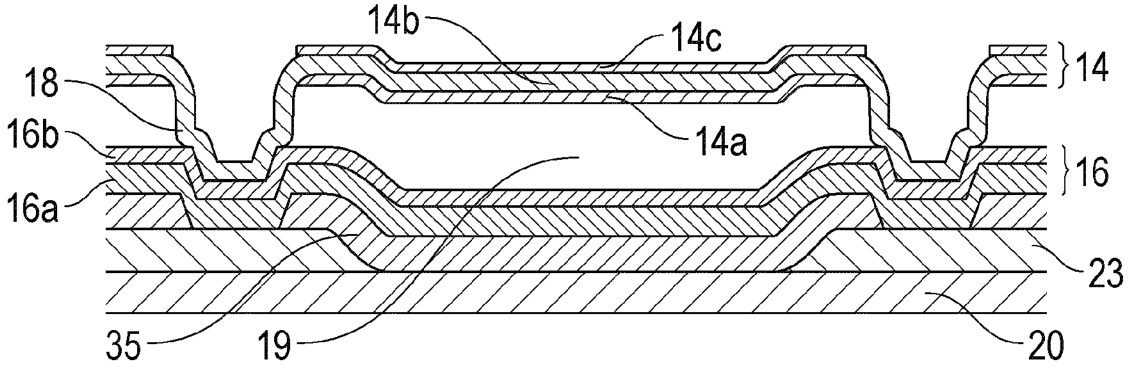

FIG. 7E is another cross-sectional illustration of an IMOD display element, where the movable reflective layer 14 is self-supporting. While FIG. 7D illustrates support posts 18 that are structurally and/or materially distinct from the movable reflective layer 14, the implementation of FIG. 7E includes support posts that are integrated with the movable reflective layer 14. In such an implementation, the movable reflective layer 14 contacts the underlying optical stack 16 at multiple locations, and the curvature of the movable reflective layer 14 provides sufficient support that the movable reflective layer 14 returns to the unactuated position of FIG. 7E when the voltage across the IMOD display element is insufficient to cause actuation. In this way, the portion of the movable reflective layer 14 that curves or bends down to contact the substrate or optical stack 16 may be considered an "integrated" support post. One implementation of the optical stack 16, which may contain a plurality of several different layers, is shown here for clarity including an optical absorber 16*a*, and a dielectric 16*b*. In some implementations, the optical absorber 16*a* may serve both as a stationary electrode and as a partially reflective layer. In some implementations, the optical absorber 16*a* can be an order of magnitude thinner than the movable reflective layer 14. In some implementations, the optical absorber 16*a* is thinner than the reflective sub-layer 14*a*.

In implementations such as those shown in FIGS. 7A-7E, the IMOD display elements form a part of a direct-view device, in which images can be viewed from the front side of the transparent substrate 20, which in this example is the side opposite to that upon which the IMOD display elements are formed. In these implementations, the back portions of the device (that is, any portion of the display device behind the movable reflective layer 14, including, for example, the deformable layer 34 illustrated in FIG. 7C) can be configured and operated upon without impacting or negatively affecting the image quality of the display device, because the reflective layer 14 optically shields those portions of the device. For example, in some implementations a bus structure (not illustrated) can be included behind the movable reflective layer 14 that provides the ability to separate the optical properties of the modulator from the electromechanical properties of the modulator, such as voltage addressing and the movements that result from such addressing.

In other implementations, alternate drive schemes may be utilized to minimize the power required to drive the display, as well as to allow a common line of electromechanical devices to be written to in a shorter amount of time. In certain implementations, a release or relaxation time of an electromechanical device such as an interferometric modulator may be longer than an actuation time of the electromechanical device, as the electromechanical device may be pulled to an unactuated or released state only via the mechanical restoring force of the movable layer. In contrast, the electrostatic force actuating the electromechanical device may act more quickly on the electromechanical device to cause actuation of the electromechanical device. In the high voltage drive scheme discussed above, the write time for a given line must be sufficient to allow not only the actuation of previously unactuated electromechanical devices, but to allow for the unactuation of previously actuated electromechanical devices. The release rate of the electromechanical devices thus acts as a limiting factor in certain implementations, which may inhibit the use of higher refresh rates for larger display arrays.

Figure 8:
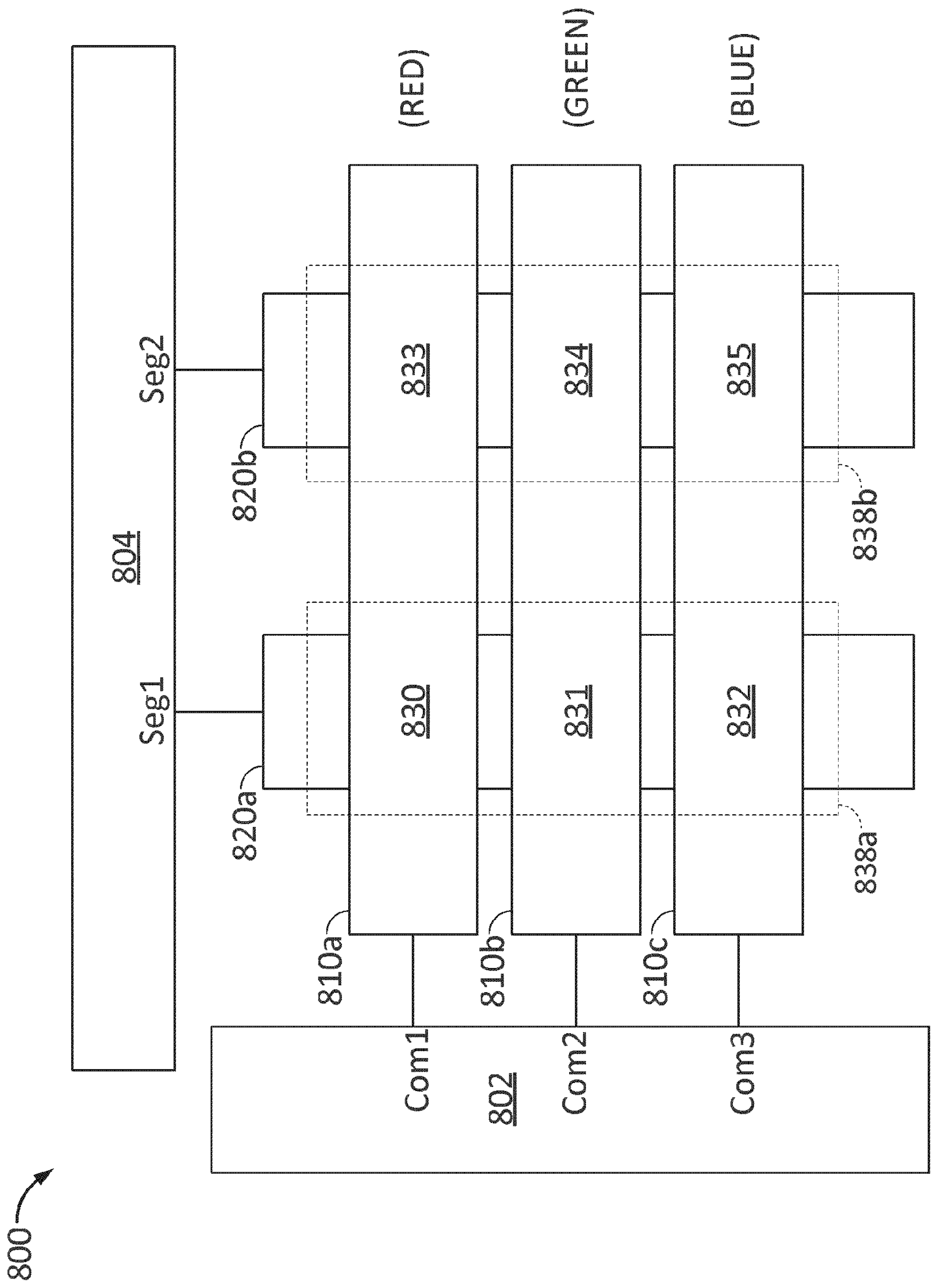
FIG. 8 is a schematic illustration of a 2×3 array of interferometric modulators illustrating color pixels.

An alternate drive scheme, referred to herein as a low voltage drive scheme, may provide improved performance over the drive scheme discussed above, in which the bias voltage is supplied by the common electrode rather than the segment electrode. This is illustrated by reference to FIGS. 8 and 9. FIG. 8 illustrates an exemplary 2×3 array segment 800 of interferometric modulators, wherein the array includes three common lines 810*a*, 810*b*, and 810*c*, and two segment lines 820*a*, 820*b*. An independently addressable pixel 830, 831, 832, 833, 834, and 835 is located at each intersection of a common line and a segment line. Thus, the voltage across pixel 830 is the difference between the voltages applied on common line 810*a* and segment line 820*a*. This voltage differential across a pixel is alternately referred to herein as a pixel voltage. Similarly, pixel 831 is the intersection of common line 810*b* and segment line 820*a*, and pixel 832 is the intersection of column line 810*c* and segment line 820*a*. Pixels 833, 834, and 835 are the intersections of segment line 820*b* with common lines 810*a*, 810*b*, and 810*c*, respectively. In the illustrated implementation, the common lines include a movable electrode, and the electrode in the segment lines are fixed portions of an optical stack, but it will be understood that in other implementations the segment lines may include movable electrodes, and the common lines may include fixed electrodes. Common voltages may be applied to common lines 810*a*, 810*b*, and 810*c* by common driver circuitry 802, and segment voltages may be applied to segment lines 820*a* and 820*b* via segment driver circuitry 804.

As will be explained further below, the pixels along each column line may be formed to reflect a different color. To make a color display, for example, the display may contain rows (or columns) of red, green, and blue pixels. Thus, the Com1 output of driver 802 may drive a line of red pixels, the Com2 output of driver 802 may drive a line of green pixels, and the Com3 output of driver 802 may drive a line of blue pixels. It will be appreciated that in an actual display, there may be hundreds of red, green, blue sets of pixel lines extending down, with FIG. 8 showing only the first set.

In one implementation of an alternate drive scheme, the voltage applied on segment lines 820*a* and 820*b* is switched between a positive segment voltage $V_{SP}$ and a negative segment voltage $V_{SN}$. The voltage applied on common lines 810*a*, 810*b*, and 810*c* is switched between 5 different voltages, one of which is a ground state in certain implementations. The four non-ground voltages are a positive hold voltage $V_{CP}$, a positive overdrive voltage $V_{OVP}$, a negative hold voltage $V_{CN}$, and a negative overdrive voltage $V_{OVN}$. The hold voltages are selected such that the pixel voltage will always lie within the hysteresis windows of the pixels (the positive hysteresis value for the positive hold voltage and the negative hysteresis value for the negative hold voltage) when appropriate segment voltages are used, and the absolute values of the possible segment voltages are sufficiently low that a pixel with a hold voltage applied on its common line will thus remain in the current state regardless of the particular segment voltage currently applied on its segment line.

In a particular implementation, the positive segment voltage $V_{SP}$ may be a relatively low voltage, on the order of 1V-2V, and the negative segment voltage $V_{SN}$ may be ground or may be a negative voltage of 1V-2V. Because the positive and negative segment voltages may not be symmetric about the ground, the absolute value of the positive hold and overdrive voltages may be less than the absolute value of the negative hold and overdrive voltages. As it is the pixel voltage which controls actuation, not just the particular line voltages, this offset will not affect the operation of the pixel in a detrimental manner, but needs merely to be accounted for in determining the proper hold and overdrive voltages.

Figure 9:
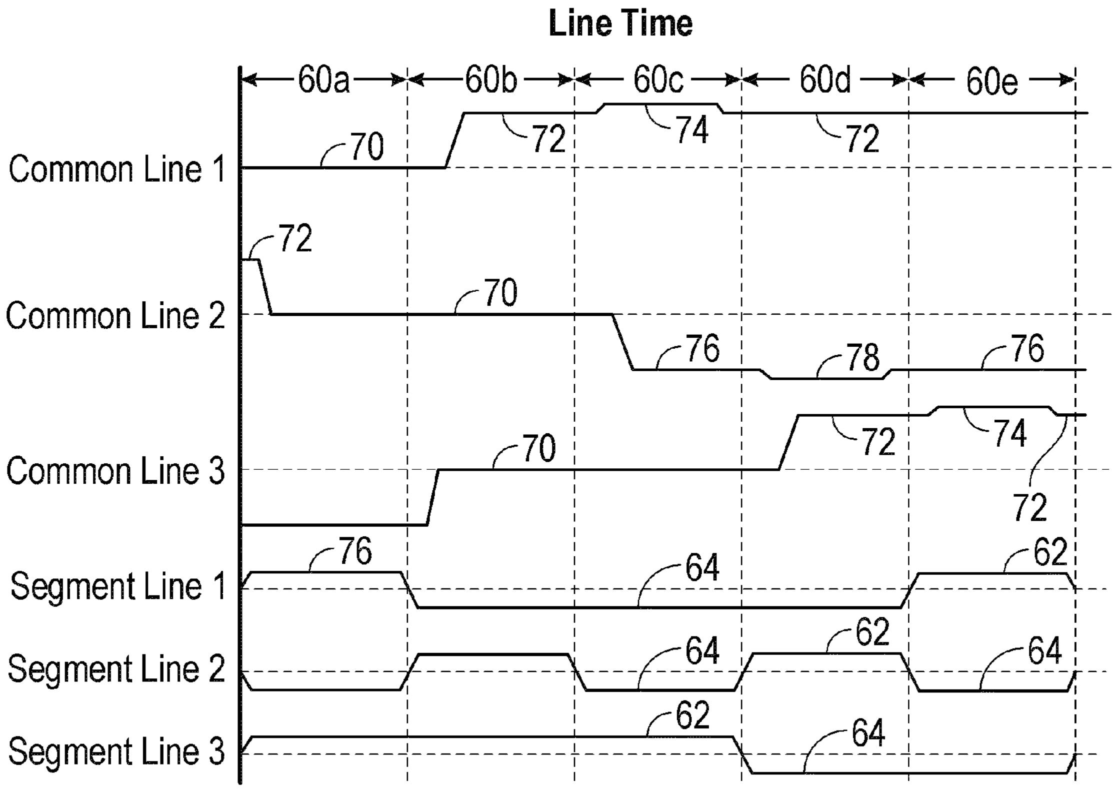
FIG. 9 illustrates an exemplary timing diagram for segment and common signals that may be used to write frames of display data to the 2×3 display of FIG. 8 using another example drive scheme.

FIG. 9 illustrates exemplary voltage waveforms which may be applied on the segment lines and common lines of FIG. 8. Waveform Seg1 represents the segment voltage as a function of time applied along segment line 820*a* of FIG. 8, and waveform Seg2 represents the segment voltage applied along segment line 820*b*. Waveform Com1 represents the common voltage applied along column line 810*a* of FIG. 8, waveform Com2 represents the common voltage applied along column line 810*b*, and waveform Com3 represents the common voltage applied along column line 810*c*.

In FIG. 9, it can be seen that each of the common line voltages begins at a positive hold value ($V_{CPR}$, $V_{CPG}$ and $V_{CPB}$ respectively). These hold values are designated differently because they will generally be different voltage levels depending on whether a red (R) line of pixels, a green (G) line of pixels, or a blue (B) line of pixels is being driven. As noted above, the state of the pixels along all common lines remain constant during application of the positive hold voltage along the common lines, regardless of the state of the segment voltages.

The common line voltage on common line 810*a* (Com1) then moves to a state $V_{REL}$, which may be ground, causing release of the pixels 830 and 833 along common line 810*a*. It can be noted in this particular implementation that the segment voltages are both negative segment voltages $V_{SN}$ at this point (as can be seen in waveforms Seg1 and Seg2), which may be ground, but given proper selection of voltage values, the pixels would release even if either of the segment voltages was at the positive segment voltage $V_{SP}$.

The common line voltage on line 810*a* (Com1) then moves to a negative hold value $V_{CNR}$. When the voltage is at the negative hold value, the segment line voltage for segment line 820*a* (waveform Seg1) is at a positive segment voltage $V_{SP}$, and the segment line voltage for segment line 820*b* (waveform Seg2) is at a negative segment voltage $V_{SN}$. The voltage across each of pixels 830 and 833 moves past the release voltage $V_{REL}$ to within the positive hysteresis window without moving beyond the positive actuation voltage. Pixels 830 and 833 thus remain in their previously released state.

The common line voltage on line 810*a* (waveform Com1) is then decreased to a negative overdrive voltage $V_{OVNR}$. The behavior of the pixels 830 and 833 is now dependent upon the segment voltages currently applied along their respective segment lines. For pixel 830, the segment line voltage for segment line 820*a* is at a positive segment voltage $V_{SP}$, and the pixel voltage of pixel 830 increases beyond the positive actuation voltage. Pixel 830 is thus actuated at this time. For pixel 833, the segment line voltage for segment line 820*b* is at a negative segment voltage $V_{SN}$, the pixel voltage does not increase beyond the positive actuation voltage, so pixel 833 remains unactuated.

Next, the common line voltage along line 810*a* (waveform Com1) is increased back to the negative hold voltage $V_{CNR}$. As previously discussed, the voltage differential across the pixels remains within the hysteresis window when the negative hold voltage is applied, regardless of the segment voltage. The voltage across pixel 830 thus drops below the positive actuation voltage but remains above the positive release voltage, and thus remains actuated. The voltage across pixel 833 does not drop below the positive release voltage, and will remain unactuated.

As indicated in FIG. 9, the common line voltage on common lines 810*b* and 810*c* moves in a similar fashion, with a delay of one line time cycle between each of the common lines to write the frame of display data to the array. After a hold period, the process is repeated with the common and segment voltages of opposite polarities.

As mentioned above, in a color display, the exemplary array segment 800 illustrated in FIG. 8 may include three colors of pixels, with each of the pixels 830-835 having a pixel of a particular color. The colored pixels may be arranged such that each common line 810*a*, 810*b*, 810*c* defines a common line of pixels of similar colors. For example, in an RGB display, pixels 830 and 833 along common line 810*a* may include red pixels, pixels 831 and 834 along common line 810*b* may include green pixels, and pixels 832 and 835 along common line 810*c* may include blue pixels. Thus, the 2×3 array may in an RGB display form two composite multicolor pixels 838*a* and 838*b*, where the multicolor pixel 838*a* includes red subpixel 830, green subpixel 831, and blue subpixel 832, and the multicolor pixel 838*b* includes red subpixel 833, green subpixel 834, and blue subpixel 835.

In such an array with different color pixels, the structure of the different color pixels varies with color. These structural differences result in differences in hysteresis characteristics, which further result in different suitable hold and actuation voltages. Assuming that the release voltage $V_{REL}$ is zero (ground), to drive an array of three different color pixels with the waveforms of FIG. 9, a power supply would need to generate a total of fourteen different voltages ($V_{OVPR}$, $V_{CPR}$, $V_{CNR}$, $V_{OVNR}$, $V_{OVPG}$, $V_{CPG}$, $V_{CNG}$, $V_{OVNG}$, $V_{OVPB}$, $V_{CPB}$, $V_{CNB}$, $V_{OVNB}$, $V_{SP}$ and $V_{SN}$) to drive the common and segment lines.

Figure 10:
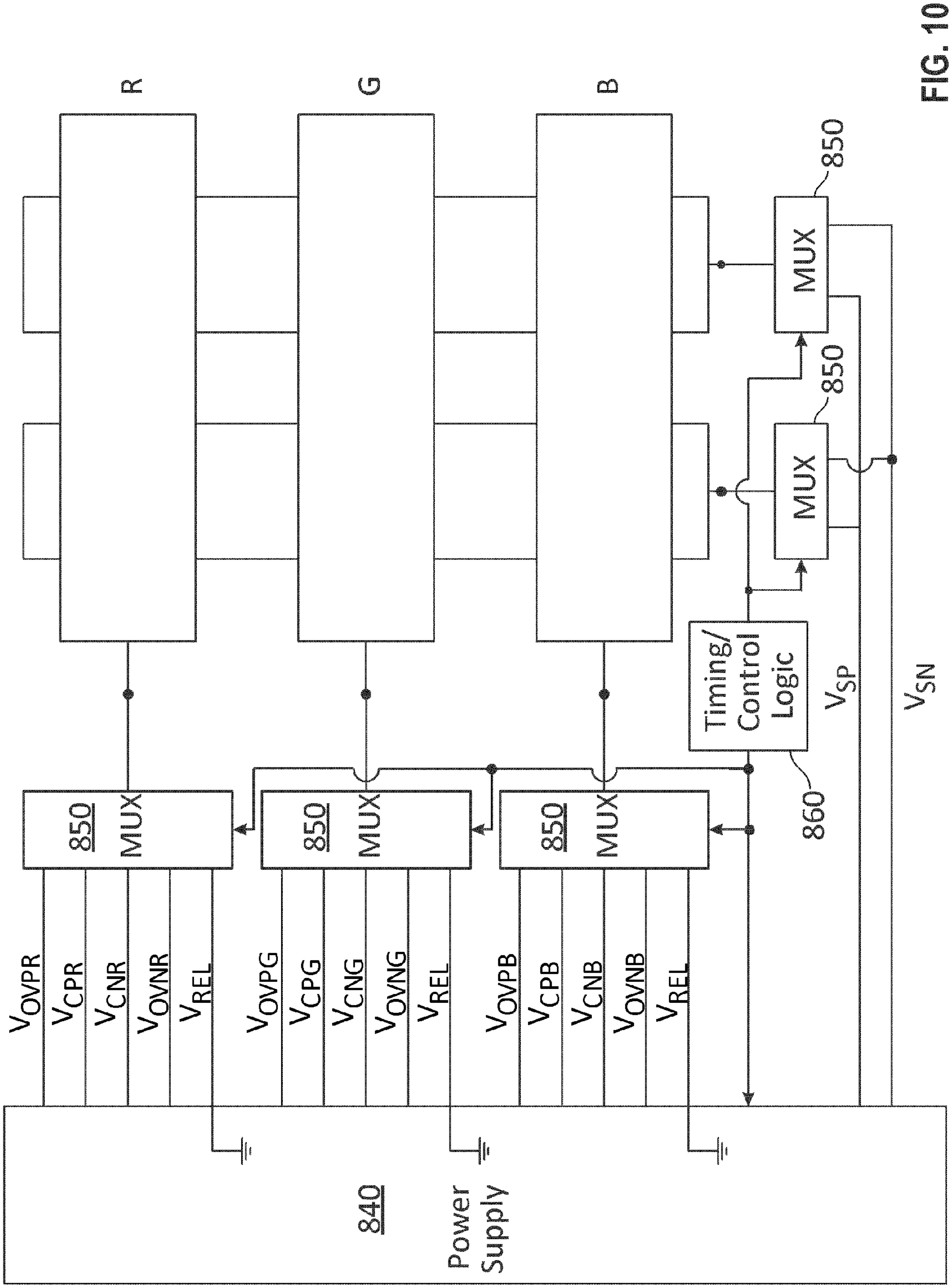
FIG. 10 is a system block diagram illustrating the generation and application of various voltages to a display when using the drive scheme of FIG. 9.

FIG. 10 illustrates an implementation of driver circuitry using such a power supply 840. The various voltages generated would be appropriately combined to produce the illustrated waveforms using, for example, multiplexers 850, and timing/controller logic 860 that are part of the drive circuits 802, 804 of FIG. 8. Continuously generating these fourteen voltage levels consumes a significant amount of power, especially since the overdrive voltages are only needed for short periods of time. This power consumption can be reduced because the positive and negative overdrive voltages $V_{OVP}$ and $V_{OVN}$ for each different color may be obtained by adding an additional voltage $V_{ADD}$ to the positive hold voltage $V_{CP}$, and subtracting $V_{ADD}$ from the negative hold voltage $V_{CN}$, where $V_{ADD}$ is the same for all colors and may itself be equal to the difference between $V_{SP}$ and $V_{SN}$. To take advantage of this, the power supply 840 uses a charge pump to derive the overdrive voltages from the hold voltages at the times required.

Figure 11:
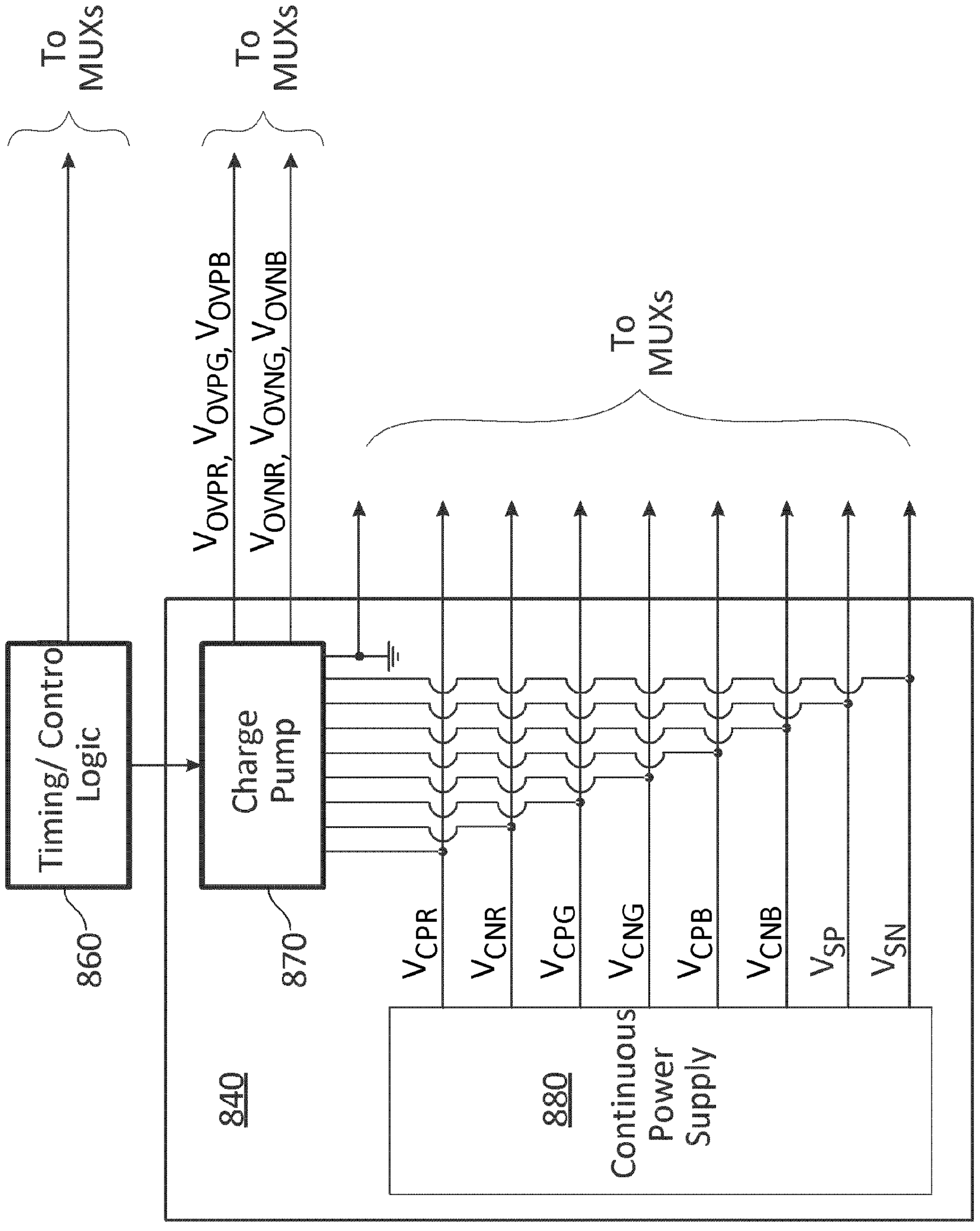
FIG. 11 is a system block diagram illustrating an implementation of the power supply of FIG. 10.

FIG. 11 is a system block diagram illustrating the generation of the various voltages used in a low voltage drive scheme according to an implementation of the charge pump containing power supply described herein. As can be seen in FIG. 11, by using an implementation of the charge pump circuit 870 (an implementation of which is described in FIG. 12 below), a continuous power supply 880 need only generate a total of eight different voltages ($V_{CPR}$, $V_{CNR}$, $V_{CPG}$, $V_{CNG}$, $V_{CPB}$, $V_{CNB}$, $V_{SP}$ and $V_{SN}$) for the common lines and segment lines. It may be noted here that the "continuous" power supply need not be in operation 100% of the time. The term continuous is intended only to mean that this power supply outputs these voltages when needed to drive and hold the display elements. In typical implementations, the hold voltages are required a large proportion of the time that the display is in operation, and therefore at least the hold voltages will be output during those periods when the display is being used to output an image. In some implementations, however, it is possible to hold images on the display for some time periods without these outputs. The charge pump 870 then generates the remaining six voltages ($V_{OVPR}$, $V_{OVNR}$, $V_{OVPG}$, $V_{OVNG}$, $V_{OVPB}$, $V_{OVNB}$) required to drive the array by adding (or subtracting) the difference between $V_{SP}$ and $V_{SN}$ to each hold voltage, as will be explained in further detail below. In addition, by using a timing and logic controller, it is possible to synchronize the output of the charge pump circuit with the common line waveforms produced by the timing circuit in order to drive the array of FIG. 8.

Figure 12:
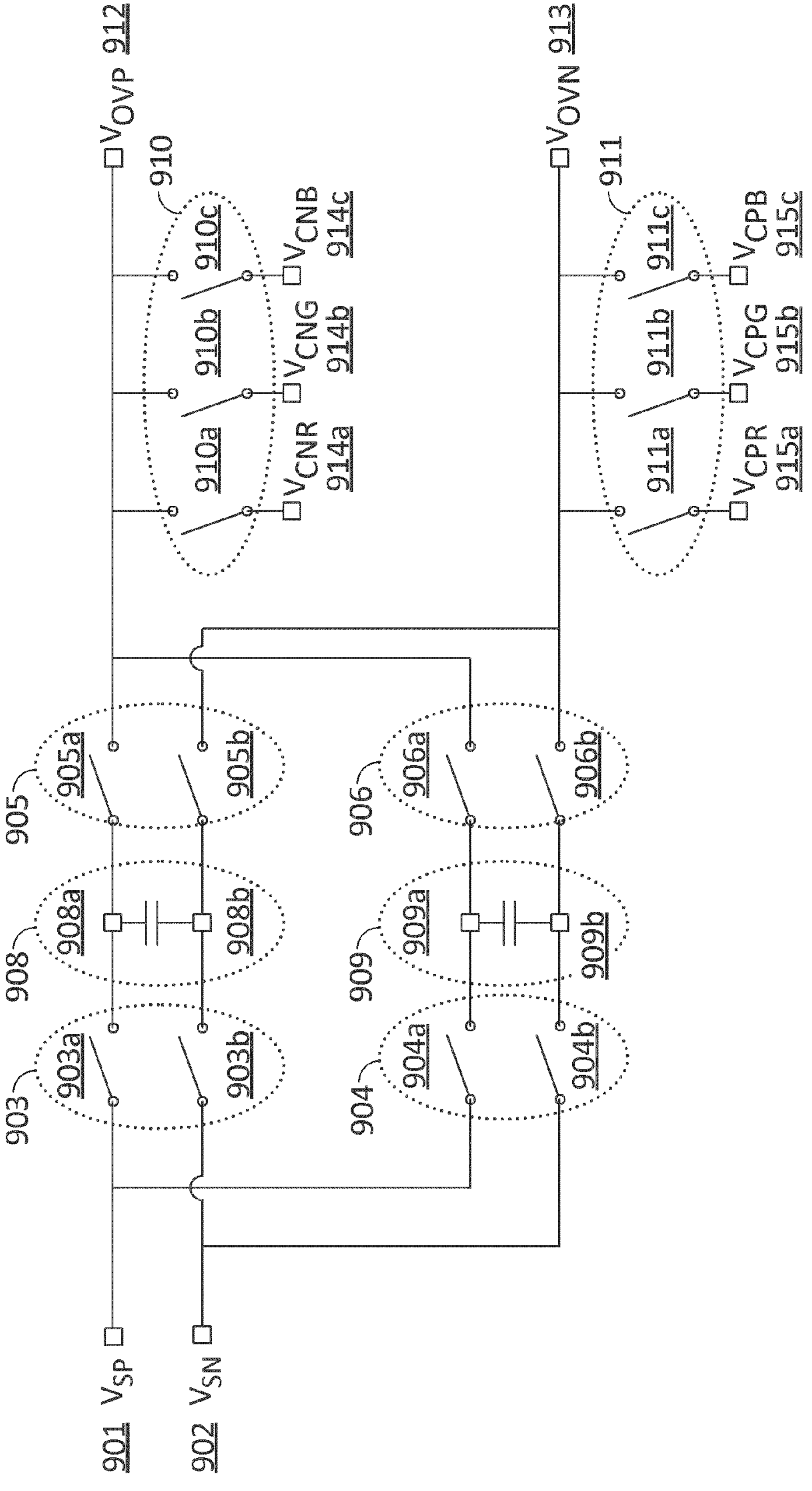
FIG. 12 illustrates a circuit diagram of an implementation of a charge pump to generate overdrive voltages useable in the system of FIG. 11.

FIG. 12 illustrates a circuit diagram of an implementation of charge pump circuitry to generate the overdrive voltages, $V_{OV}$. The circuitry illustrated includes a supply voltage $V_{SP}$ across terminals $V_{SP}$ 901 and $V_{SN}$ 902 (where as noted above $V_{SN}$ may be ground in some implementations), pairs of switches 903, 904, 905 and 906, plurality of switches 910, 911, alternating capacitors 908 and 909, and lines 914*a*-914*c* and 915*a*-915*c* as inputs for negative and positive hold voltages $V_C$, for red, green and blue pixels.

Still referring to FIG. 12, switch 903*a* couples the positive terminal of the supply voltage, $V_{Sp}$ 901, to the positive terminal of the first alternating capacitor, 908*a*. Similarly, switch 903*b* couples the negative terminal of the supply voltage, $V_{SN}$ 902, to the negative terminal of the first alternating capacitor, 908*b*. Switch 904*a* couples the positive terminal of the supply voltage, $V_{SP}$ 901, to the positive terminal of the second alternating capacitor, 909*a*. Similarly, switch 904*b* couples the negative terminal of the supply voltage, $V_{SN}$ 902, to the negative terminal of the second alternating capacitor, 909*b*. Switch 905*a* couples the positive terminal of the first alternating capacitor, 908*a* to the positive overdrive voltage line $V_{OVP}$, 912. Similarly, switch 905*b* couples the negative terminal of the first alternating capacitor, 908*b* to the negative overdrive voltage line $V_{OVN}$, 913. Switch 906*a* couples the positive terminal of the second alternating capacitor, 909*a* to the positive overdrive voltage line $V_{OVP}$, 912. Similarly, switch 906*b* couples the negative terminal of the second alternating capacitor, 909*b* to the negative overdrive voltage line $V_{OVN}$, 913. Switch 910*a* couples the positive overdrive voltage line $V_{OVP}$, 912 to the negative hold voltage for driving a red pixel, $V_{CNR}$, 914*a*. Similarly, switch 910*b* couples the positive overdrive voltage line $V_{OVP}$, 912 to the negative hold voltage for driving a green pixel, $V_{CNG}$, 914*b*. Furthermore, switch 910*c* couples the positive overdrive voltage line $V_{OVP}$, 912 to the negative hold voltage for driving a blue pixel, $V_{CNB}$, 914*c*. Similarly, switch 911*a* couples the negative overdrive voltage line $V_{OVN}$, 913 to the positive hold voltage for driving a red pixel, $V_{CPR}$, 915*a*. Similarly, switch 911*b* couples the negative overdrive voltage line $V_{OVN}$, 913 to the positive hold voltage for driving a green pixel, $V_{CPG}$, 915*b*. Furthermore, switch 911*c* couples the negative overdrive voltage line $V_{OVN}$, 913 to the positive hold voltage for driving a blue pixel, $V_{CPB}$, 915*c*.

The timing/control logic circuitry illustrated in FIGS. 10 and 11 ensures that the charge pump operates in such a way that at any point in time, one of the alternating capacitors is being charged with the supply voltage, $V_{SP}$, while the other alternating capacitor is being used to contribute in creating the overdrive voltage, $V_{OV}$. In one cycle, the timing/control logic circuitry closes or activates switches 903 and 906 while opening or deactivating switches 904 and 905 such that capacitor 908 is being charged with the supply voltage, $V_{SP}$, while capacitor 909 is coupled to an output such that the voltage across the capacitor 909 creates an overdrive voltage $V_{OV}$. In another cycle, the timing/control logic circuitry closes or activates switches 904 and 905 while opening or deactivating switches 903 and 906 such that capacitor 909 is being charged with the supply voltage, $V_{SP}$, while the voltage across capacitor 908 is coupled to an output such that the voltage across the capacitor 908 creates an overdrive voltage $V_{OV}$. The voltage across the charged capacitor is thus selectively added to or subtracted from a hold voltage to produce the corresponding overdrive voltage.

During each of the cycles, the timing/control logic circuitry also ensures that only one of the six switches 910*a*-910*c* and 911*a*-911*c* is closed or activated at any one time. The overdrive voltage line, $V_{OV}$ is thus coupled to only one of the common lines at a time. For example, when the timing/control logic circuitry closes switch 910*a*, the overdrive voltage $V_{OV}$ is coupled to the common voltage line for creating a negative hold voltage across a red pixel, $V_{CNR}$ 914*a*. The remaining switches 910*b*-910*c* and 911*a*-911*c* operate in a similar fashion.

In some implementations, the number of, and connections between different switches and capacitors used may be different, such that the timing/control logic circuitry's activation and deactivation of switches may go through more or less cycles than the circuit described above in order to charge the capacitors and generate the overdrive voltages.

Figure 13:
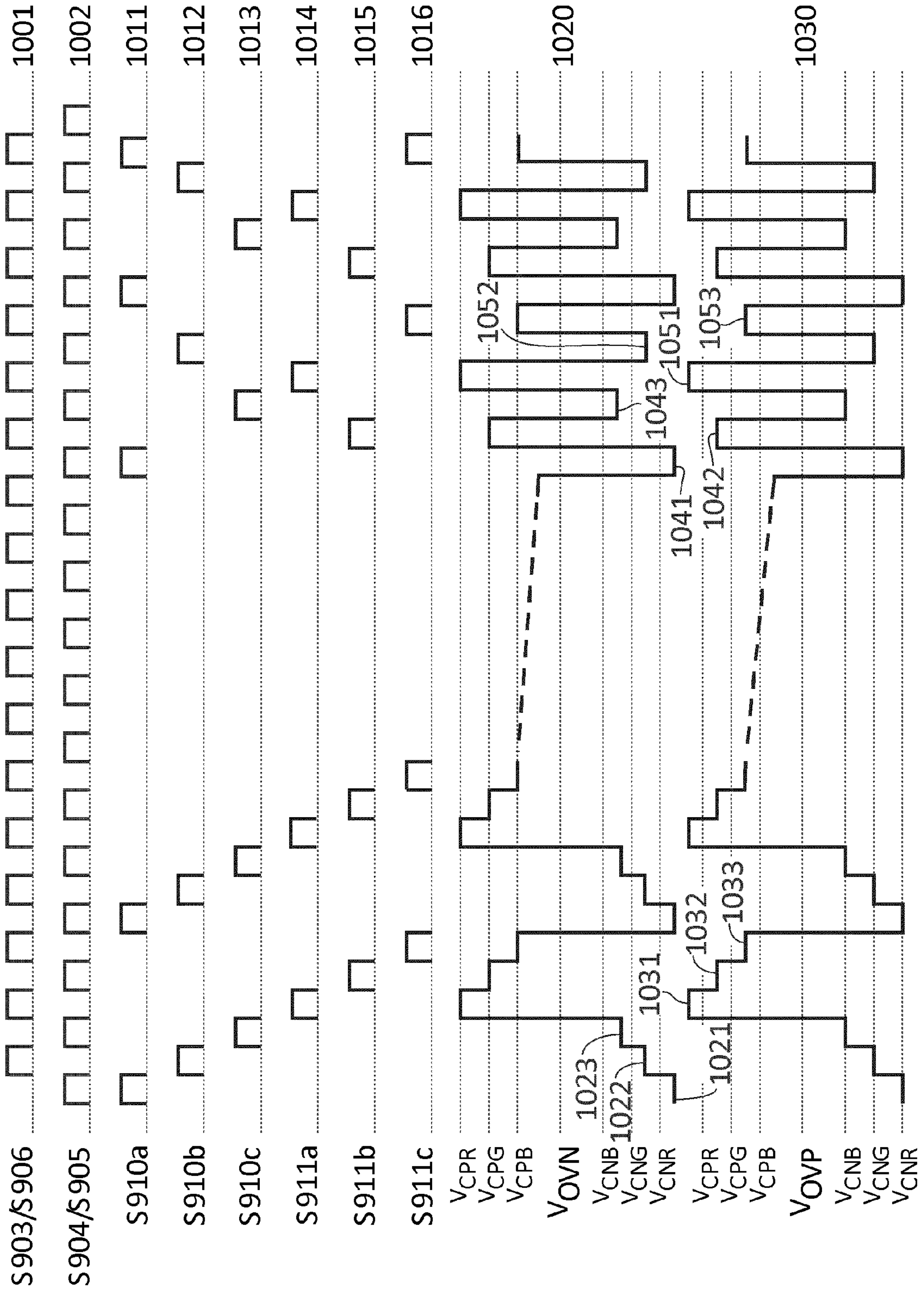
FIG. 13 illustrates a timing diagram for overdrive voltage signals generated by the implementation of the charge pump illustrated in FIG. 12.

FIG. 13 illustrates a timing diagram for the switches in an implementation of the charge pump illustrated in FIG. 12 as well as the overdrive voltage signals generated by this implementation of the charge pump. Waveform 1001 represents the timing of switch activation and deactivation for switches 903 and 906. Waveform 1002 represents the timing of switch activation and deactivation for switches 904 and 905. Waveform 1011 represents the timing of switch activation for switch 910*a*. Waveform 1012 represents the timing of switch activation for switch 910*b*. Waveform 1013 represents the timing of switch activation for switch 910*c*. Waveform 1014 represents the timing of switch activation for switch 911*a*. Waveform 1015 represents the timing of switch activation for switch 911*b*. Waveform 1016 represents the timing of switch activation for switch 911*c*.

Waveforms 1020 and 1030 illustrate the output voltages on lines $V_{OVN}$ and $V_{OV}$ respectively that are generated by the implementation of the circuit in FIG. 12 when activating and deactivating the switches as indicated in waveforms 1001-1002 and 1011-1016.

As indicated on the left side of FIG. 13, during the first illustrated cycle, when the switches 904 and 905 are activated, as seen in waveform 1002, and when the switch 910*a* is activated, as seen in waveform 1011, there is a negative overdrive voltage created for a red pixel, as seen at 1021. During the next cycle, switches 903 and 906 are activated, as seen in waveform 1001, and switches 904 and 905 are deactivated as seen in waveform 1002. When the switch 910*b* is activated as seen in waveform 1012, there is a negative overdrive voltage created for a green pixel, as seen at 1022. During the next cycle, switches 904 and 905 are activated again, as seen in waveform 1001, and switches 903 and 906 are deactivated as seen in waveform 1002. When the switch 910*c* is activated as seen in waveform 1013, there is a negative overdrive voltage created for a blue pixel, as seen at 1023. During the next cycle, when the switches 904 and 905 are activated again, as seen in waveform 1002, and when the switch 911*a* is activated, as seen in waveform 1014, there is a positive overdrive voltage created for a red pixel, as seen at 1031. During the next cycle, switches 903 and 906 are activated again, as seen in waveform 1001, and switches 904 and 905 are deactivated as seen in waveform 1002. When the switch 911*b* is activated as seen in waveform 1012, there is a positive overdrive voltage created for a green pixel, as seen at 1032. During the next cycle, switches 904 and 905 are activated again, as seen in waveform 1001, and switches 903 and 906 are deactivated as seen in waveform 1002. When the switch 911*c* is activated as seen in waveform 1013, there is a positive overdrive voltage created for a blue pixel, as seen at 1033. This sequential cycle of switches for the same polarity followed by switches of different polarity may be repeated.

Alternatively, as indicated on the right side of FIG. 13, it is also possible to generate overdrive voltages in other orders. When the switches 904 and 905 are activated, as seen in waveform 1002, and when the switch 910*a* is activated, as seen in waveform 1011, there is a negative overdrive voltage created for a red pixel, as seen at 1041. During the next cycle, switches 903 and 906 are activated again, as seen in waveform 1001, and switches 904 and 905 are deactivated as seen in waveform 1002. When the switch 911*b* is activated as seen in waveform 1012, there is a positive overdrive voltage created for a green pixel, as seen at 1042. During the next cycle, switches 904 and 905 are activated again, as seen in waveform 1001, and switches 903 and 906 are deactivated as seen in waveform 1002. When the switch 910*c* is activated as seen in waveform 1013, there is a negative overdrive voltage created for a blue pixel, as seen at 1043. During the next cycle, when the switches 904 and 905 are activated again, as seen in waveform 1002, and when the switch 911*a* is activated, as seen in waveform 1014, there is a positive overdrive voltage created for a red pixel, as seen at 1051. During the next cycle, switches 903 and 906 are activated again, as seen in waveform 1001, and switches 904 and 905 are deactivated as seen in waveform 1002. When the switch 910*b* is activated as seen in waveform 1012, there is a negative overdrive voltage created for a green pixel, as seen at 1052. During the next cycle, switches 904 and 905 are activated again, as seen in waveform 1001, and switches 903 and 906 are deactivated as seen in waveform 1002. When the switch 911*c* is activated as seen in waveform 1013, there is a positive overdrive voltage created for a blue pixel, as seen at 1053.

Since the timing/logic controller controls switches 910*a-c* and 911*a*-911*c* independently of one another, it is possible to generate overdrive voltages for the colors and polarities desired in any order, and not limited to the examples described above. Furthermore, since the timing/logic controller also controls the application of the voltages to the common lines through the multiplexers, the timing/logic controller can be configured to generate the required overdrive voltages at the timing necessary to generate the waveforms of FIG. 9 as they are applied to the different common lines of the display array.

Figure 14:
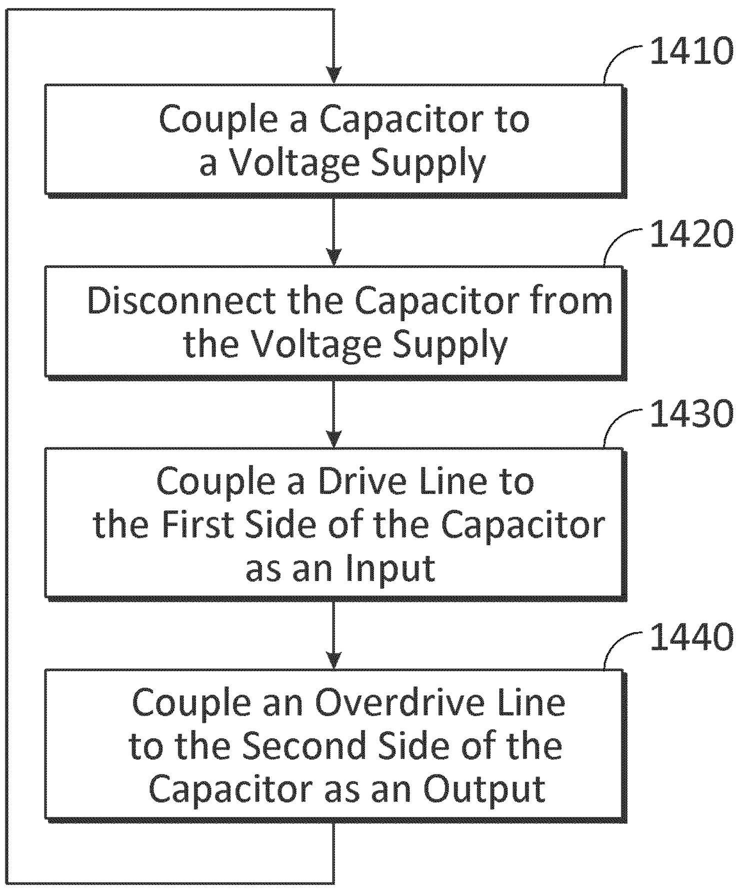
FIG. 14 is a flowchart of an implementation of a process for generating overdrive voltages.

FIG. 14 is a flowchart of an implementation of a process for generating overdrive voltages. At step 1410, a capacitor is coupled to a voltage supply. In one implementation, this coupling is done by activating switches. As a result of the coupling, the capacitor is charged with the voltage from the supply line. At step 1420, the capacitor is disconnected from the voltage supply. In one implementation, this disconnection is done by deactivating switches. At step 1430, a drive line is connected to the first side of the capacitor as an input. In one implementation, the drive line may be the common line hold voltage of a display array. At step 1440, an overdrive line is connected to the second side of the capacitor as an output. In one implementation, the overdrive line may be the common line overdrive voltage of a display array. As indicated in FIG. 14, steps 1410 through 1440 are repeated.

Advantageously, the present method generates the overdrive voltages used to drive the common lines of a display with lower power consumption due to less switching and smaller voltage ranges. The method also provides more flexibility to allow combination with any driving scheme employed by the display driver.

Figure 15:
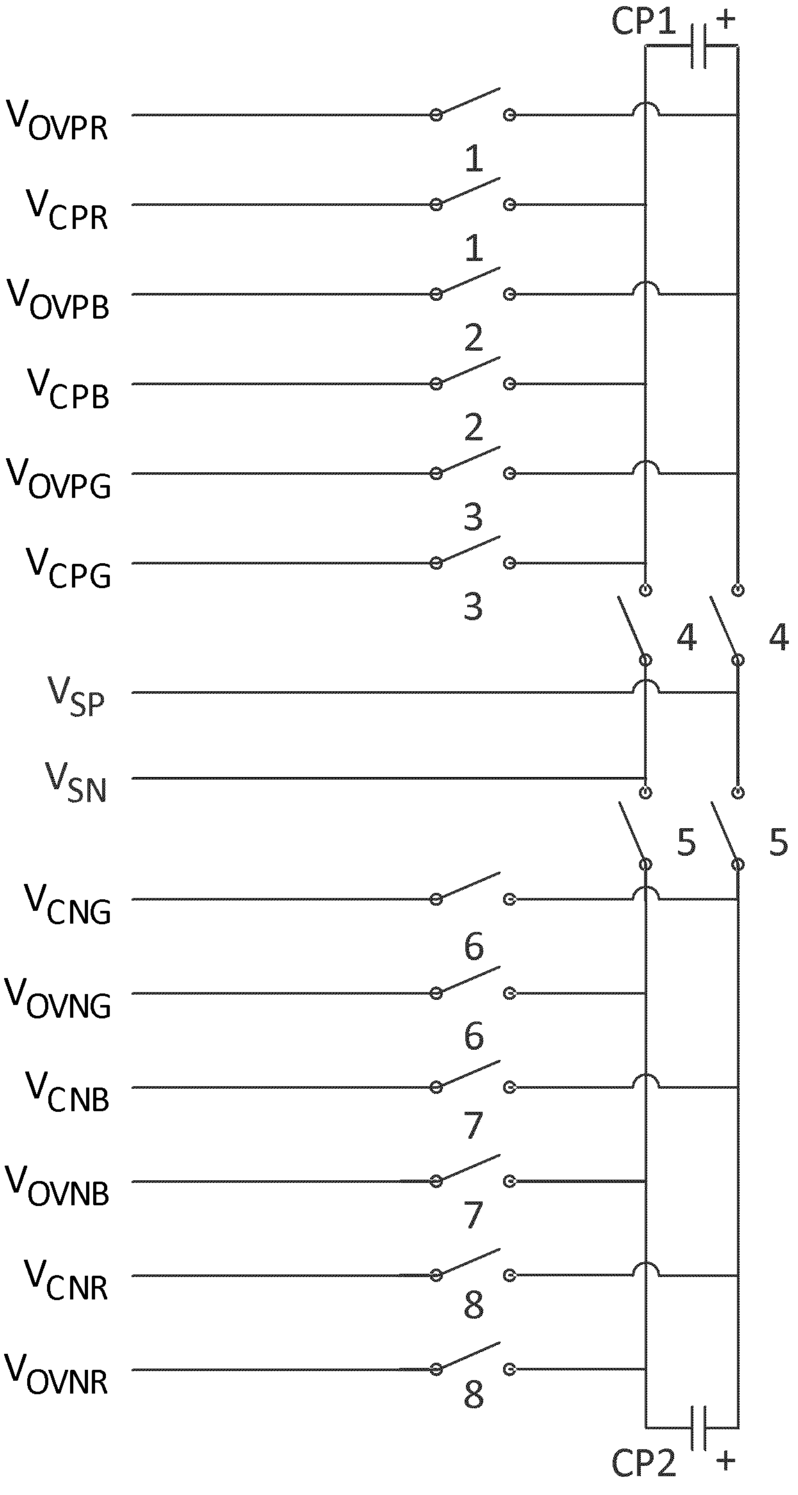
FIG. 15 illustrates a second implementation of a charge pump for generating overdrive voltages.

FIG. 15 illustrates another implementation of the charge pump illustrated in FIG. 11. Similar to the implementation illustrated in FIG. 12, the charge pump illustrated in FIG. 15 also includes a supply voltage of the difference between $V_{SP}$ and $V_{SN}$, several pairs of switches, and two alternating capacitors. The circuit operates in such a way that during one cycle, one of the alternating capacitors is being charged with the supply voltage while an overdrive voltage is produced with the other capacitor. During another cycle, the other alternating capacitor is being charged with the supply voltage while an overdrive voltage of opposite polarity is being produced with the first capacitor. For example, when switch 5 is closed to charge capacitor CP2, switch 1 may be closed to produce $V_{OVPR}$ from $V_{CPR}$ and capacitor CP1.

Figure 16:
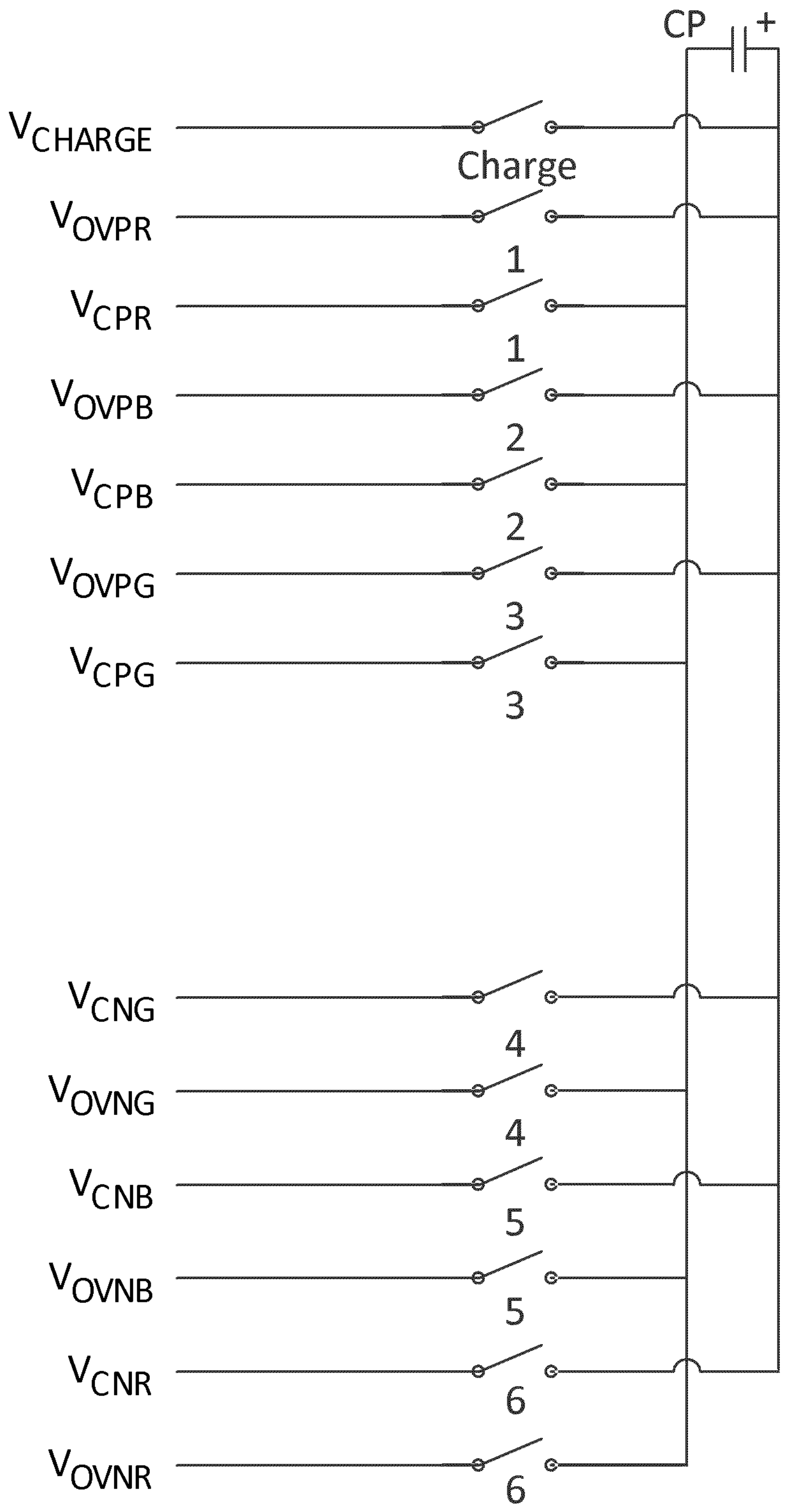
FIG. 16 illustrates a third implementation of a charge pump for generating overdrive voltages.

FIG. 16 illustrates another implementation of the charge pump illustrated in FIG. 11. The implementation in FIG. 16 uses only one capacitor. The circuit operates in such a way that during one cycle, the capacitor is being charged with an additional voltage, $V_{CHARGE}$ from the continuous power supply illustrated in FIG. 11. During this charge cycle, switch Charge and switch 1 are closed. In this implementation, $V_{CHARGE}$ is produced by the continuous power supply and is equal to $V_{OVPR}$. During the next cycle, the desired overdrive voltage is produced with the capacitor by closing any one of the switches 1-6.

Figure 17:
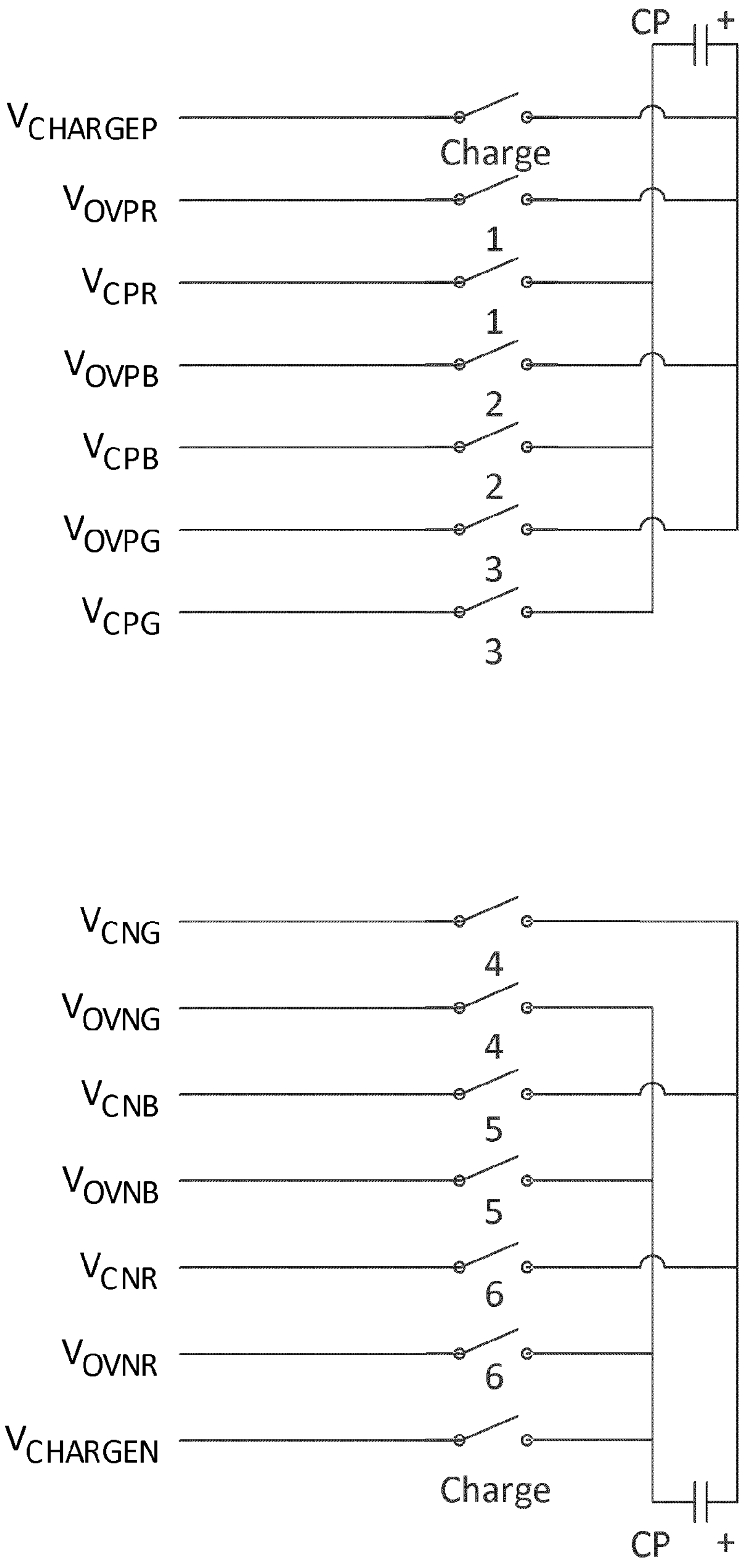
FIG. 17 illustrates a fourth implementation of a charge pump for generating overdrive voltages.

FIG. 17 illustrates another implementation of the charge pump illustrated in FIG. 11. In this implementation, two additional outputs of the continuous power supply, $V_{CHARGEP}$ and $V_{CHARGEN}$, are generated and used, one for each polarity. The circuit operates in the same way as the implementation of FIG. 16, but the positive and negative sections can be controlled independently. In this implementation, $V_{CHARGEP}$ and $V_{CHARGEN}$ are equal to $V_{OVPR}$ and $V_{OVNR}$ respectively.

Figure 18:
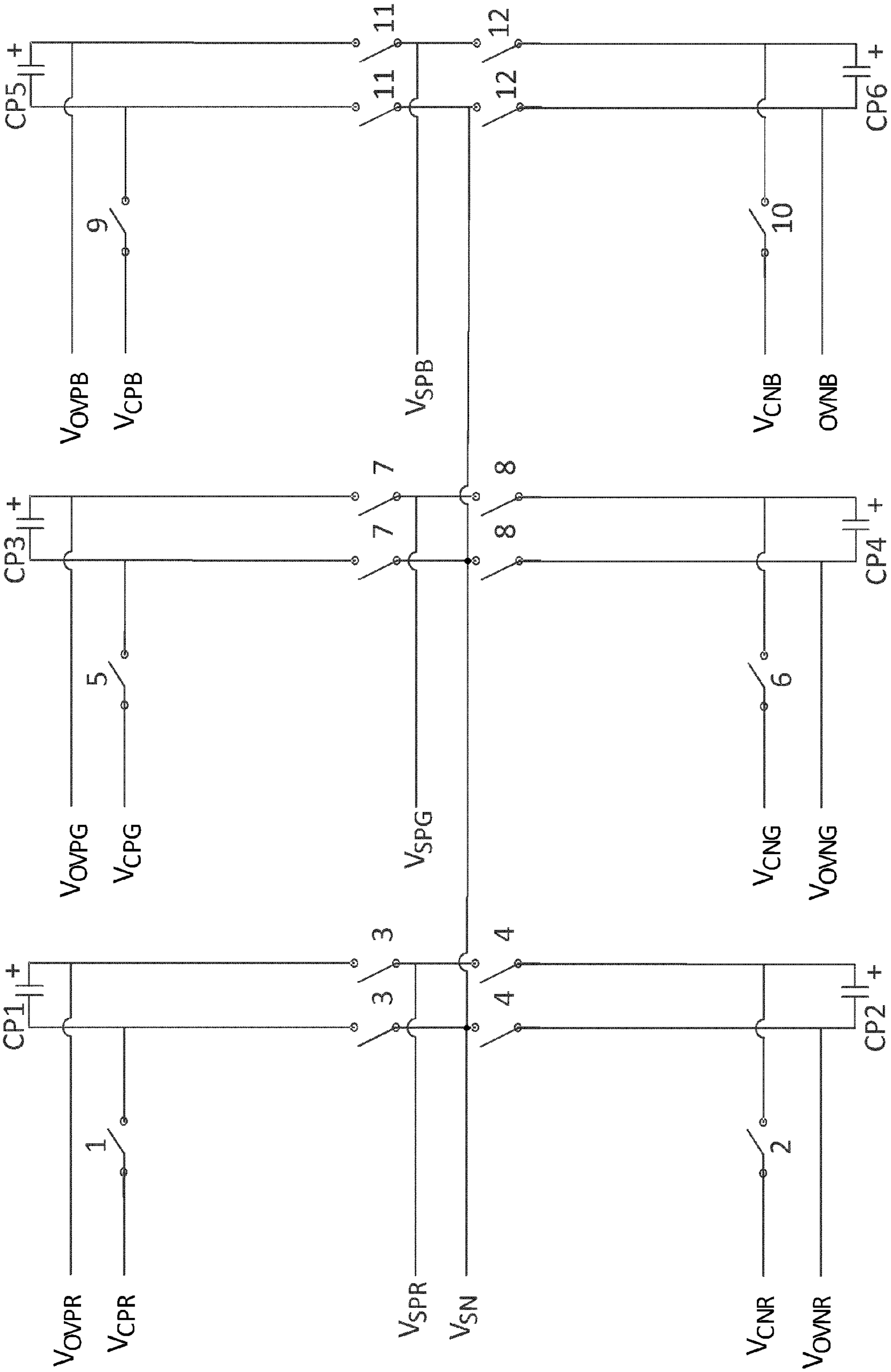
FIG. 18 illustrates a fifth implementation of a charge pump for generating overdrive voltages.

FIG. 18 illustrates another implementation of the charge pump illustrated in FIG. 11. In this implementation, the circuitry illustrated includes a separate positive input voltage $V_{SP}$ for each of the red (R) lines of pixels, the green (G) lines of pixels, and the blue (B) lines of pixels. For example, a supply voltage across terminals $V_{SPR}$ and $V_{SN}$ is provided to produce the overdrive boost for the R lines of pixels, a supply voltage across terminals $V_{SPG}$ and $V_{SN}$ is provided to produce the overdrive boost for the G lines of pixels, and a supply voltage across terminals $V_{SPB}$ and $V_{SN}$ is provided to produce the overdrive boost for the B lines of pixels. The negative segment voltage terminal $V_{SN}$ is common for each of the colored line of pixels, and may be the same $V_{SN}$ provided to the segments when driving the array. The $V_{SP}$ provided to the segments when driving the array may be one of the $V_{SPR}$, $V_{SPB}$, or $V_{SPG}$, or may be separately generated and different from these input voltages. Further, the circuitry illustrated includes a separate group of switches and capacitors for each of the different color lines of pixels and for the positive and negative polarities. The switches 1 and 2, the pairs of switches 3 and 4, and the alternating capacitors CP1 and CP2 correspond to the R lines of pixels. The switches 5 and 6, the pairs of switches 7 and 8, and the alternating capacitors CP3 and CP4 correspond to the G lines of pixels. The switches 9 and 10, the pairs of switches 11 and 12, and the alternating capacitors C5 and CP6 correspond to the B lines of pixels.

An advantage of providing separate inputs $V_{SPR}$, $V_{SPG}$, and $V_{SPB}$ and separate capacitors as illustrated in FIG. 18 is that different overdrive boost voltages can be added to the hold voltages for the different color lines of pixels. Another advantage of the circuit of FIG. 18 is that there are no switches directly connected across negative and positive voltages, as is the case, for example, with switch 911*c* located between $V_{OVN}$ and $V_{CPB}$ of FIG. 12. This allows the use of lower voltage switches, leading to a smaller circuit size. Another advantage is that one-way switches may be used in the circuit instead of two-way switches, again leading to a smaller circuit size. For example, the switch 1 only needs to supply current in one direction to produce the positive overdrive voltage $V_{OVPR}$. Further, the pair of switches 3 need only be operated to supply current in one direction to charge the capacitor CP1. None of the switches are required to conduct in one direction at some times, and other directions at other times.

Another significant advantage is that each of the output overdrive voltages is directly connected to its corresponding boost capacitor, such as between $V_{OVPR}$ and CP1, because there is a separate capacitor per overdrive boost voltage output. This configuration eliminates a transistor switching the overdrive voltage. Thus, well biasing is not required at high voltage as would be required in, for example, FIG. 15. This can be useful in implementations of the display array of FIGS. 10 and 11 where the overdrive voltages have magnitudes of at least positive and negative 20 V, and where the switching circuitry for the charge pump (designated 870 in FIG. 11) is implemented on a different integrated circuit from the multiplexer switching circuits (designated 850 in FIG. 10). If the overdrive voltages have magnitudes of 20 V or more, power supply rails of the same or larger magnitude are needed to drive any transistor switches with source terminals connected to the large magnitude overdrive voltages. With the charge pump design of FIG. 18, overdrive output magnitudes of 20 V or more can be generated with transistors driven with the lower hold voltage levels $V_{CP}$ and $V_{CN}$, which may be about positive or negative 16 V or lower magnitude. This allows integrated circuit process technology suitable for lower voltage operation to be used for the integrated circuit (e.g., circuit 840 of FIG. 10) on which the charge pump switching circuits are implemented. The multiplexer (MUX) switching circuits that couple the overdrive voltages to the common lines at the appropriate times will utilize 20 V or more power supply rails and process technology that supports these voltages, but eliminating this requirement for the integrated circuit of the charge pump switches can save production costs.

Various combinations of the above implementations and methods discussed above are contemplated. In particular, although the above implementations are primarily directed to implementations in which interferometric modulators of particular elements are arranged along common lines, interferometric modulators of particular colors may instead be arranged along segment lines in other implementations. In particular, implementations, different values for positive and negative segment voltages may be used for specific colors, and identical hold, release and overdrive voltages may be applied along common lines. In further implementations, when multiple colors of subpixels are located along common lines and segment lines, such as the four-color display discussed above, different values for positive and negative segment voltages may be used in conjunction with different values for hold and overdrive voltages along the common lines, so as to provide appropriate pixel voltages for each of the four colors.

It is also to be recognized that, depending on the implementation, the acts or events of any methods described herein can be performed in other sequences, may be added, merged, or left out altogether (e.g., not all acts or events are necessary for the practice of the methods), unless the text specifically and clearly states otherwise.

While the above detailed description has shown, described, and pointed out novel features as applied to various implementations, various omissions, substitutions, and changes in the form and details of the device of process illustrated may be made. Some forms that do not provide all of the features and benefits set forth herein may be made, and some features may be used or practiced separately from others.

The invention claimed is:

1. A display driver circuit configured to drive a display array with a waveform having a plurality of voltages, wherein a first subset of the plurality of voltages is different from a second subset of the plurality of voltages by a defined amount, the display driver circuit comprising:

power supply circuitry configured to generate the first subset of the plurality of voltages; and a charge pump having the first subset of the plurality of voltages as inputs and the second subset of the plurality of voltages as outputs on a plurality of overdrive lines and including a separate boost capacitor for each of the second subset of the plurality of voltages on the plurality of overdrive lines;

wherein each of the plurality of overdrive lines is directly connected to its corresponding boost capacitor.

2. The display driver circuit of claim 1, wherein each of the second subset of the plurality of voltages has a positive or negative magnitude of at least 20 volts.

3. The display driver circuit of claim 1, wherein the display array comprises a plurality of common lines and a plurality of segment lines.

4. The display driver circuit of claim 3, wherein each of the plurality of common lines includes display elements of only a single color, wherein the plurality of output voltages includes a different output voltage for different color display elements and for different polarities, and wherein the charge pump includes a separate boost capacitor for each color and each polarity.

5. The display driver circuit of claim 3, further including one or more switching circuits connected between the second subset of the plurality of voltages and the plurality of common lines.

6. The display driver circuit of claim 5, wherein the one or more switching circuits are implemented on a different integrated circuit from the charge pump.

7. The display driver circuit of claim 6, wherein at least a portion of the power supply circuitry configured to generate at least some of the first subset of the plurality of voltages is implemented on a different integrated circuit from the one or more switching circuits and the charge pump.

8. The display driver circuit of claim 3, wherein the first subset of the plurality of voltages includes hold voltages for application to the common lines, and wherein the second subset of the plurality of voltages includes overdrive voltages for application to the common lines.

9. The display driver circuit of claim 8, wherein the first subset of the plurality of voltages includes segment voltages for application to the segment lines.

10. The display driver circuit of claim 4, wherein the different color display elements include red, green, and blue.

11. A method of driving a display array with a waveform having a plurality of voltages, wherein a first subset of the plurality of voltages is different from a second subset of the plurality of voltages by a defined amount, the method comprising:

generating the first subset of the plurality of voltages, and generating the second subset of the plurality of voltages using a charge pump with switching circuits implemented on a first integrated circuit, the charge pump including a plurality of boost capacitors and having the first subset of plurality of voltages as inputs and the second subset of the plurality of voltages as outputs on a plurality of overdrive lines; and directly routing voltage on output terminals of the boost capacitors to the plurality of overdrive lines without passing through a switch on the first integrated circuit.

12. The method of claim 11, wherein the display array comprises a plurality of common lines and a plurality of segment lines.

13. The method of claim 12, further comprising driving each of the plurality of common lines with a common voltage and driving each of the plurality of segment lines with a segment voltage.

14. The method of claim 13, wherein the common voltage includes a hold voltage and an overdrive voltage.

15. A display driver circuit configured to drive a display array with a waveform having a plurality of voltages, wherein a first subset of the plurality of voltages is different from a second subset of the plurality of voltages by a defined amount, the display driver circuit comprising:

means for generating the first subset of the plurality of voltages, and means for generating the second subset of the plurality of voltages using a charge pump having the first subset of the plurality of voltages as inputs and the second subset of the plurality of voltages as outputs on a plurality of overdrive lines, and including a separate boost capacitor for each of the second subset of the plurality of voltage on the plurality of overdrive lines, and wherein each of the plurality of overdrive lines is directly connected to its corresponding boost capacitor.

16. The display driver circuit of claim 15, wherein the display array comprises a plurality of common lines and a plurality of segment lines.

17. The display driver circuit of claim 16, further including means for switching the second subset of the plurality of voltages onto selected ones of the plurality of common lines.

18. The display driver circuit of claim 17, wherein switching circuitry of the charge pump is implemented on a different integrated circuit from the means for switching the second subset of the plurality of voltages onto selected ones of the plurality of common lines.

19. The display driver circuit of claim 18, wherein each of the second subset of the plurality of voltages has a positive or negative magnitude of at least 20 volts.

20. The display driver circuit of claim 16, wherein each of the plurality of common lines includes display elements of only a single color, wherein the second subset of the plurality of output voltages includes a different output voltage for different color display elements and for different polarities, and wherein the charge pump includes a separate boost capacitor for each color and each polarity.

* * * * *